US012757920B2

(12) United States Patent
Safonov et al.

(10) Patent No.: US 12,757,920 B2
(45) Date of Patent: Oct. 13, 2026

(54) HYDROGEN-GENERATING COMPOSITION FOR DIETARY AND AGRICULTURAL APPLICATIONS

(71) Applicant: H2 Universe LLC, Granbury, TX (US)

(72) Inventors: Vladimir L. Safonov, Grandbury, TX (US); Marina Safonov, Granbury, TX (US); Christian S. Yorgure, Rochester, NY (US)

(73) Assignee: H2 Universe LLC, Granbury, TX (US)

(*) Notice: Subject to any disclaimer, the term of this patent is extended or adjusted under 35 U.S.C. 154(b) by 746 days.

(21) Appl. No.: 18/091,881

(22) Filed: Dec. 30, 2022

(65) Prior Publication Data

US 2023/0225386 A1 Jul. 20, 2023

Related U.S. Application Data

(60) Provisional application No. 63/361,506, filed on Dec. 30, 2021.

(51) Int. Cl.

| | |
|---|---|
| ***A23L 33/16*** | (2016.01) |
| ***A23L 33/00*** | (2016.01) |
| ***A23L 33/125*** | (2016.01) |
| ***A23L 33/15*** | (2016.01) |
| ***A23L 33/175*** | (2016.01) |
| ***C05D 5/00*** | (2006.01) |
| ***C05G 3/80*** | (2020.01) |

(52) U.S. Cl.
CPC ............. *A23L 33/16* (2016.08); *A23L 33/125* (2016.08); *A23L 33/15* (2016.08); *A23L 33/175* (2016.08); *A23L 33/30* (2016.08); *C05D 5/00* (2013.01); *C05G 3/80* (2020.02)

(58) Field of Classification Search
CPC ........................................................ A23L 33/16
See application file for complete search history.

(56) References Cited

U.S. PATENT DOCUMENTS 4,139,369 A * 2/1979 Kandler .................... C21C 1/02 75/566
6,352,715 B1 3/2002 Hwang et al.
7,041,325 B2 * 5/2006 Kubota ................... A23L 33/22 426/573
8,252,311 B2 * 8/2012 Ohtani ...................... A61P 3/02 426/94
8,449,908 B2 5/2013 Stinchcomb et al.
8,852,660 B2 10/2014 Miljkovic
9,144,581 B2 9/2015 Miljkovic
9,238,012 B2 1/2016 Hiraoka et al.
9,962,340 B2 5/2018 Weimann
10,016,486 B1 7/2018 Pyun et al.
10,071,090 B2 9/2018 Stinchcomb et al.
10,076,540 B1 9/2018 Perricone
10,272,125 B2 4/2019 Weimann
11,364,261 B2 6/2022 Safonov et al.
2006/0251738 A1 * 11/2006 Thone .................... A61K 33/10 424/724
2007/0110676 A1 5/2007 Clymer et al.
2009/0326447 A1 12/2009 Joshi
2010/0152683 A1 6/2010 Lindgren et al.
2010/0272789 A1 10/2010 Satoh et al.
2013/0034542 A1 2/2013 Ganter et al.
2013/0323190 A1 12/2013 Ohta et al.
2015/0258136 A1 9/2015 Lucas
2018/0092816 A1 4/2018 Perricone et al.
2018/0289629 A1 10/2018 Abyazani et al.
2019/0308001 A1 10/2019 Safonov
2020/0030372 A1 1/2020 Safonov et al.
2020/0206261 A1 * 7/2020 Pittz ....................... A01K 61/13
2020/0281866 A1 9/2020 Tsaur et al.
2020/0345992 A1 11/2020 Safonov et al.
2021/0220185 A1 7/2021 Safonov et al.

OTHER PUBLICATIONS

Alexander, et al., “Approaches for breaking the barriers of drug permeation through transdermal drug delivery,” Journal of Controlled Release, vol. 164, pp. 26-40, 2012.
Alkilani, et al., “Transdermal Drug Delivery: Innovative Pharmaceutical Developments Based on Disruption of the Barrier Properties of the stratum corneum,” Pharmaceutics, vol. 7, pp. 438-470, 2015.
Amirkhani, et al., “Relation between Fluoxetine and Menstrual Cycle Disorders,” Journal of Family and Reproductive Health, vol. 6, No. 3, pp. 95-98, 2012.
Dixon, et al., “The evolution of molecular hydrogen: a noteworthy potential therapy with clinical significance,” Medical Gas Research, vol. 3, No. 10, 12 pages, 2013.
Harel, “Dysmenorrhea in Adolescents and Young Adults: Etiology and Management,” J Pediatr Adolesc Gynecol, vol. 19, pp. 363-371, 2006.
Herman, et al., “Essential oils and their constituents as skin penetration enhancer for transdermal drug delivery: a review,” Journal of Pharmacy and Pharmacology, vol. 67, pp. 473-485, 2014.
Huang, et al., “Recent advances in hydrogen research as a therapeutic medical gas,” Free Radic Res, vol. 44, No. 9, pp. 971-982, Sep. 2010.
Khodakarami, et al., “The Severity of Dysmenorrhea and its Relationship with Body Mass Index among Female Adolescents in Hamadan, Iran,” Journal of Midwifery & Reproductive Health, vol. 3, No. 4, pp. 444-450, 2015.
Kobayashi, et al., “Hydrogen generation by reaction of Si nanopowder with neutral water,” J Nanopart Res, vol. 19, 9 pages, 2017.
Li, et al., “The Applications of Molecular Hydrogen in Horticulture,” Horticulturae, vol. 7, No. 513, 18 pages, 2021.

(Continued)

*Primary Examiner* — Gina C Justice
(74) *Attorney, Agent, or Firm* — Morgan, Lewis & Bockius LLP

(57) ABSTRACT

Disclosed herein are compositions composition comprising powder form metallic magnesium and $CaMg(CO_3)_2$ capable of forming molecular hydrogen and methods of using the same for dietary supplementation and soil conditioning and fertilization.

20 Claims, 1 Drawing Sheet

(56) References Cited

OTHER PUBLICATIONS

Li, et al., "Hydrogen Commonly Applicable from Medicine to Agriculture: From Molecular Mechanisms to the Field," Curr Pharm Des, vol. 27, No. 5, pp. 747-759, 2021.
Lucas, et al., "Molecular mechanisms underpinning laser printer and photocopier induced symptoms, including chronic fatigue syndrome and respiratory tract hyperresponsiveness: pharmacological treatment with Cinnamon and Hydrogen," Neuroendocrinology Letters, vol. 34, No. 8, pp. 723-737, 2013.
Lucas, et al., "Role of the Toll Like Receptor (TLR) Radical Cycle in Chronic Inflammation: Possible Treatments Targeting the TLR4 Pathway," Mol. Neurobiol., vol. 48, pp. 190-204, 2013.
Matei, et al., "Emerging mechanisms and novel applications of hydrogen gas therapy," Medical Gas Research, vol. 8, No. 3, pp. 98-102, 2018.
Negriff, et al., "The measurement of menstrual symptoms: Factor structure of the menstrual symptom questionnaire in adolescent girls," J Health Psychol. vol. 14, No. 7, pp. 899-908, 2009.
Nicolson, et al., "Clinical Effects of Hydrogen Administration: From Animal and Human Diseases to Exercise Medicine," International Journal of Clinical Medicine, vol. 7, pp. 32-76, 2016.
Ohta, et al., "Recent Progress Toward Hydrogen Medicine: Potential of Molecular Hydrogen for Preventive and Therapeutic Applications," Current Pharmaceutical Design, vol. 17, pp. 2241-2252, 2011.
Ostojic, "Should hydrogen therapy be included in a musculoskeletal medicine routine?" F1000 Research, vol. 5 pages, 2016.
Pastore, et al., "Transdermal patches: history, development and pharmacology," British Journal of Pharmacology, vol. 172, pp. 2179-2209, 2015.
Pereira, et al., "Traditional Therapies for Skin Wound Healing," Advances in Wound Care, vol. 5. No. 5, pp. 208-229, 2016.
Safonov, et al., "Hydrogen nanobubbles in a water solution of dietary supplement," Physicochemistry Engineering Aspects, vol. 436, 3 pages, 2013.
Screen shot of Krucik, G., Acute upper respiratory infection, 2013, https://www.healthline.com/health/ acute-upper-respiratory-infection#causes from The Wayback Machine (Year: 2013).
Tamaki, et al., "Hydrogen-Rich Water Intake Accelerates Oral Palatal Wound Healing via Activation of the Nrf2/Antioxidant Defense Pathways in a Rat Model," Oxidative Medicine and Cellular Longevity, vol. 2016, 13 pages, 2016.
Unsal, et al., "Evaluation of Dysmenorrhea Among Women and its Impact on Quality of Life in a Region of Western Turkey," Pak J Med Sci, vol. 26, No. 1, pp. 142-147, 2010.
Unsal, et al., "Prevalence of dysmenorrhea and its effect on quality of life among a group of female university students," Upsala Journal of Medical Sciences, vol. 115, No. 2, pp. 138-145, 2010.
Wang, et al., "The cytokine storm and factors determining the sequence and severity of organ dysfunction in multiple organ dysfunction syndrome," American Journal of Emergency Medicine, vol. 26, pp. 711-715, 2008.
Wat, "The common cold: a review of literature," European Journal of Internal Medicine, vol. 15, pp. 79-88, 2004.

* cited by examiner

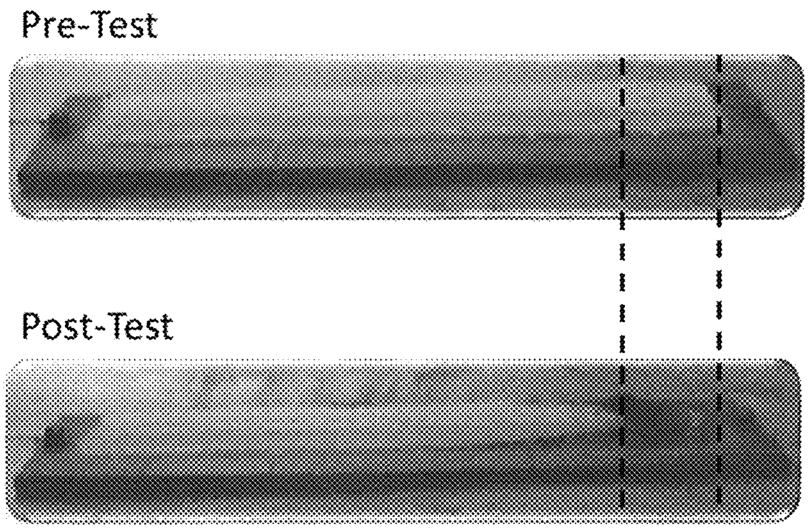
Pre-Test
Post-Test

HYDROGEN-GENERATING COMPOSITION FOR DIETARY AND AGRICULTURAL APPLICATIONS

CROSS-REFERENCE TO RELATED APPLICATIONS

This application claims the benefit of and priority to U.S. Provisional Application No. 63/361,506, filed Dec. 30, 2021, the contents of which are herein incorporated by reference in their entirety.

TECHNICAL FIELD

The present disclosure provides, in part, hydrogen-generating compositions and methods of using the same for dietary supplementation and soil fertilization.

BACKGROUND

Over the past two decades hydrogen utilization for therapy in animals and agricultural application has gained attention. Current mixtures for generating hydrogen focus on using metallic magnesium, for example, where metallic magnesium has been used to produce negative oxidation reduction potential for use in various mixtures. However, magnesium powder can spontaneously ignite on contact with air and generate massive amounts of heat, and thus the mixtures are particularly dangerous due to their propensity to combust and produce burns. Metallic magnesium by itself is a hazardous substance. The manufacture of products with Mg metal powder into pharmaceutical forms, such as sachets, pills, tablets, or capsules is a hazardous undertaking because manipulation of the powder is dangerous. Correspondingly, manufacturing plants avoid working with metallic magnesium particles.

The current mixtures for generation of hydrogen using metallic magnesium have the potential of causing serious burns and stomach problems due to their exothermic reaction and/or ignition. To feasibly implement hydrogen-generating products for use in health and agriculture, there remains a need to 1) generate appreciable amounts of hydrogen gas, 2) in a controlled manner that does not result in heat or fire, such that 3) the bioavailability of the hydrogen is enhanced.

SUMMARY

Accordingly, provided herein are compositions comprising powder form metallic magnesium and $CaMg(CO_3)_2$ (i.e. dolomite) wherein the composition forms molecular hydrogen in the presence of an acid solution and/or water.

In embodiments, the powder form of metallic magnesium and $CaMg(CO_3)_2$ are present in a mass ratio of 1:m, where m is greater than 5. In embodiments, the powder form metallic magnesium is about or at least about mesh 200 to about or at least about mesh 350.

In embodiments, the composition comprises one or more metal salts. In embodiments, the one or more metal salts comprises potassium (K), sodium (Na), calcium (Ca), magnesium (Mg), zinc (Zn), iron (Fe), boron (B), and/or aluminum.

In embodiments, the composition comprises one or more dietary ingredients. In embodiments, the one or more dietary ingredients comprises a water soluble vitamin, fat soluble vitamin, alkali metal, alkali earth metal, transition metal, halogen, co-factor, coenzyme, amino acid, carbohydrate, or lipid.

In embodiments, the water soluble vitamin comprises one or more of thiamine (vitamin B1), riboflavin (vitamin B2), niacin (vitamin B3), pantothenic acid (vitamin B5), pyridoxine (vitamin B6), biotin (vitamin B7), folate (vitamin B9), cobalamin (vitamin B12), and/or ascorbic acid/ascorbate (Vitamin C).

In embodiments, the fat soluble vitamin comprises one or more of carotenoids/retinoids (vitamin A), 1,25-dihydroxycholecalciferol (vitamin D), ergocalciferol (vitamin D2), cholecalciferol (vitamin D3), vitamin E, vitamin K, phylloquinone (vitamin K1), menoquinones (vitamin K2).

In embodiments, the alkali metal comprises sodium (Na), lithium (Li), and/or potassium (K). In embodiments, the alkali earth metal comprises magnesium (Mg) and/or calcium (Ca).

In embodiments, the transition metal comprises one or more of iron (Fe), copper (Cu), manganese (Mn), molybdenum (Mb), chromium (Ch), cobalt (Co), selenium (Se), zinc (Zn), and/or nickel (Ni).

In embodiments, the halogen is fluoride (F), chloride (CI), bromine (Br), and/or iodine (I).

In embodiments, the co-factor comprises one or more of pyrophosphate, adenosine triphosphate (ATP), adenosine diphosphate (ADP), S-adenosyl methionine (SAM), and/or nicotinamide.

In embodiments, the coenzyme comprises one or more Coenzyme A, biotin, Coenzyme Q (Q10), coenzyme vitamin B2, and/or flavin adenine dinucleotide (FAD).

In embodiments, the amino acid comprises one or more of alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, and/or valine.

In embodiments, the carbohydrate comprises one or more of glucose, fructose, galactose, sucrose, lactose, and/or maltose.

In embodiments, the lipid comprises one or more of linoleic acid, arachidonic acid, eicosapentaenoic acid (EPA), and/or docosahexaenoic acid (DHA).

In embodiments, the composition comprises one or more food biopolymers. In embodiments, the one or more food biopolymers comprises one or more edible vegetable oil, animal fat, wheat gluten, starch, cellulose, gelatin, dextran, casein, collagen, alginate, pectin, tapioca, polylactic acid, polycaprolactone, and/or xanthan gum.

In embodiments, the composition comprises one or more flavoring agents. In embodiments, the composition comprises one or more pharmaceutical excipients.

In embodiments, the composition comprises one or more antibiotics. In embodiments, the composition comprises one or more therapeutic agents.

In embodiments, the one or more metals salts, one or more dietary ingredients, one or more food biopolymers, one or more flavoring agents, one or more pharmaceutical excipients, one or more antibiotics, and/or one or more therapeutic agents is present in a range of about or at least about 1 mcg to about or at least about 900 mg per 1000 mg of composition, or in a range of about or at least about 0.0001% w/w to about or at least about 90% w/w.

In embodiments, the composition comprises one or more one or more nitrogen sources. In embodiments, the one or more nitrogen sources comprise ammonium nitrate ($NH_4NO_3$), ammonium sulfate ($(NH_4)_2SO_4$), calcium nitrate ($Ca(NO_3)_2$), monoammonium phosphate ($(NH_4)H_2PO_4$), diammonium phosphate, ($(NH_4)_2HPO_4$), potassium nitrate ($KNO_3$), urea, and/or isobutylidene diurea.

In embodiments, the composition comprises one or more phosphorous sources. In embodiments, the composition comprises one or more carbon sources. In embodiments, the one or more carbon sources comprise magnesium carbonate ($MgCO_3$), calcium carbonate($CaCO_3$), carbonic acid ($H_2CO_3$), bicarbonate ($HCO_3^-$), and/or carbonate ($CO_3^-$).

In embodiments, the one or more nitrogen sources, one or more phosphorous sources, and/or one or more carbon sources is present in a range of about or at least about 1 mg to about or at least about 900 mg per 1000 mg of composition, or in a range of about or at least about 0.1% w/w to about or at least about 90% w/w.

In embodiments, the total magnesium content is in a range of about or at least about 10 mg to about or at least about 900 mg per 1000 mg of composition, or in a range of about or at least about 1% w/w to about or at least about 90% w/w.

In embodiments, the composition comprises about or at least about 10 mg of total magnesium, about or at least about 20 mg of total magnesium, about or at least about 30 mg of total magnesium, about or at least about 40 mg of total magnesium, about or at least about 50 mg of total magnesium, about or at least about 60 mg of total magnesium, about or at least about 70 mg of total magnesium, about or at least about 80 mg of total magnesium, about or at least about 90 mg of total magnesium, about or at least about 100 mg of total magnesium, about or at least about 150 mg of total magnesium, about or at least about 200 mg of total magnesium, about or at least about 250 mg of total magnesium, about or at least about 300 mg of total magnesium, about or at least about 350 mg of total magnesium, about or at least about 400 mg of total magnesium, about or at least about 450 mg of total magnesium, about or at least about 500 mg, about or at least about 600 mg, about or at least about 700 mg, about or at least about 800 mg, about or at least about 900 mg or more of total magnesium per 1000 mg of composition.

In embodiments, the total $CaMg(CO_3)_2$ content is in a range of about or at least about 10 mg to about or at least about 900 mg per 1000 mg of composition, or in a range of about or at least about 1% w/w to about or at least about 90% w/w.

In embodiments, the composition comprises about or at least about 10 mg of total $CaMg(CO_3)_2$, about or at least about 20 mg of total $CaMg(CO_3)_2$, about or at least about 30 mg of total $CaMg(CO_3)_2$, about or at least about 40 mg of total $CaMg(CO_3)_2$, about or at least about 50 mg of total $CaMg(CO_3)_2$, about or at least about 60 mg of total $CaMg(CO_3)_2$, about or at least about 70 mg of total $CaMg(CO_3)_2$, about or at least about 80 mg of total $CaMg(CO_3)_2$, about or at least about 90 mg of total $CaMg(CO_3)_2$, about or at least about 100 mg of total $CaMg(CO_3)_2$, about or at least about 150 mg of total $CaMg(CO_3)_2$, about or at least about 200 mg of total $CaMg(CO_3)_2$, about or at least about 250 mg of total $CaMg(CO_3)_2$, about or at least about 300 mg of total $CaMg(CO_3)_2$, about or at least about 350 mg of total $CaMg(CO_3)_2$, about or at least about 400 mg of total $CaMg(CO_3)_2$, about or at least about 450 mg of total $CaMg(CO_3)_2$, about or at least about 500 mg of total $CaMg(CO_3)_2$, about or at least about 600 mg of total $CaMg(CO_3)_2$, about or at least about 700 mg of total $CaMg(CO_3)_2$, about or at least about 800 mg of total $CaMg(CO_3)_2$, about or at least about 900 mg or more of total of total $CaMg(CO_3)_2$ per 1000 mg of composition.

In embodiments, the powder form metallic magnesium and $CaMg(CO_3)_2$ are formulated to generate about or at least about 1 mg of molecular hydrogen, about or at least about 2 mg of molecular hydrogen, about or at least about 3 mg of molecular hydrogen, about or at least about 4 mg of molecular hydrogen, about or at least about 1 mg of molecular hydrogen, about or at least about 5 mg of molecular hydrogen, about or at least about 6 mg of molecular hydrogen, about or at least about 7 mg of molecular hydrogen, about or at least about 8 mg of molecular hydrogen, about or at least about 9 mg of molecular hydrogen, about or at least about 10 mg, about or at least about 15 mg, about or at least about 20 mg, about or at least about 25 mg, about or at least about 30 mg, about or at least about 35 mg, about or at least about 40 mg, about or at least about 45 mg, about or at least about 50 mg, about or at least about 55 mg, about or at least about 60 mg, about or at least about 65 mg, about or at least about 70 mg, about or at least about 75 mg or more of molecular hydrogen per 1000 mg of composition.

In embodiments, the composition is suitable for formulation into one or more of a tablet, capsule, pill, sachet, powder, granule, spray, and/or stick. In embodiments, the composition is suitable for oral consumption. In embodiments, the acid solution is hydrochloric acid and/or gastric juice.

Described herein, in embodiments, is a composition for dietary consumption comprising powder form of metallic magnesium at a mesh of about or at least about 200 to about or at least about 350, and $CaMg(CO_3)_2$, where the powder form metallic magnesium and $CaMg(CO_3)_2$ are present in a mass ratio of 1:m, where m is greater than 5, the powder form metallic magnesium and $CaMg(CO_3)_2$ are formulated to generate molecular hydrogen in the presence of an acid, and the composition is suitable for formulation into one or more of a tablet, capsule, pill, sachet, powder, and/or stick for oral consumption.

In embodiments, the composition for dietary consumption comprises one or more metal salts, wherein the one or more metal salts comprises potassium (K), sodium (Na), calcium (Ca), magnesium (Mg), zinc (Zn), iron (Fe), boron (B), and/or aluminum (Al), one or more dietary ingredients, wherein the one or more dietary ingredients is a water soluble vitamin, fat soluble vitamin, alkali metal, alkali earth metal, transition metal, halogen, co-factor, coenzyme, amino acid, carbohydrate, or lipid, one or more food biopolymers, wherein the one or more food biopolymers is an edible vegetable oil, animal fat, wheat gluten, starch, cellulose, gelatin, dextran, casein, collagen, alginate, pectin, tapioca, polylactic acid, polycaprolactone, and/or xanthan gum, one or more flavoring agents, one or more pharmaceutical excipients, and/or one or more antibiotics and/or therapeutics agents.

In embodiments, the one or more metal salts, one or more dietary ingredients, one or more food biopolymers, one or more flavoring agents, one or more pharmaceutical excipients, and/or one or more antibiotics and/or therapeutics agents is present in a range of about or at least about 1 mcg to about or at least about 900 mg per 1000 mg of composition, or in a range of about or at least about 0.0001% w/w to about or at least about 90% w/w.

In embodiments, the composition for dietary consumption comprises a total magnesium content is in a range of about or at least about 10 mg to about or at least about 900 mg per 1000 mg of composition, or in a range of about or at least about 1% w/w to about or at least about 90% w/w.

In embodiments, the composition for dietary consumption comprises about or at least about 10 mg of total magnesium, about or at least about 20 mg of total magnesium, about or at least about 30 mg of total magnesium, about or at least about 40 mg of total magnesium, about or at least about 50 mg of total magnesium, about or at least about 60 mg of total magnesium, about or at least about 70 mg of total magnesium, about or at least about 80 mg of total magnesium, about or at least about 90 mg of total magnesium, about or at least about 100 mg of total magnesium, about or at least about 150 mg of total magnesium, about or at least about 200 mg of total magnesium, about or at least about 250 mg of total magnesium, about or at least about 300 mg of total magnesium, about or at least about 350 mg of total magnesium, about or at least about 400 mg of total magnesium, about or at least about 450 mg of total magnesium, about or at least about 500 mg, about or at least about 600 mg, about or at least about 700 mg, about or at least about 800 mg, about or at least about 900 mg or more of total magnesium per 1000 mg of composition.

In embodiments, the composition for dietary consumption comprises a total $CaMg(CO_3)_2$ content is in a range of about or at least about 10 mg to about or at least about 900 mg per 1000 mg of composition, or in a range of about or at least about 1% w/w to about or at least about 90% w/w.

In embodiments, the composition for dietary consumption comprises about or at least about 10 mg of total $CaMg(CO_3)_2$, about or at least about 20 mg of total $CaMg(CO_3)_2$, about or at least about 30 mg of total $CaMg(CO_3)_2$, about or at least about 40 mg of total $CaMg(CO_3)_2$, about or at least about 50 mg of total $CaMg(CO_3)_2$, about or at least about 60 mg of total $CaMg(CO_3)_2$, about or at least about 70 mg of total $CaMg(CO_3)_2$, about or at least about 80 mg of total $CaMg(CO_3)_2$, about or at least about 90 mg of total $CaMg(CO_3)_2$, about or at least about 100 mg of total $CaMg(CO_3)_2$, about or at least about 150 mg of total $CaMg(CO_3)_2$, about or at least about 200 mg of total $CaMg(CO_3)_2$, about or at least about 250 mg of total $CaMg(CO_3)_2$, about or at least about 300 mg of total $CaMg(CO_3)_2$, about or at least about 350 mg of total $CaMg(CO_3)_2$, about or at least about 400 mg of total $CaMg(CO_3)_2$, about or at least about 450 mg of total $CaMg(CO_3)_2$, about or at least about 500 mg of total $CaMg(CO_3)_2$, about or at least about 600 mg of total $CaMg(CO_3)_2$, about or at least about 700 mg of total $CaMg(CO_3)_2$, about or at least about 800 mg of total $CaMg(CO_3)_2$, about or at least about 900 mg or more of total of total $CaMg(CO_3)_2$ per 1000 mg of composition.

In embodiments, the powder form metallic magnesium and $CaMg(CO_3)_2$ are formulated to generate about or at least about 1 mg of molecular hydrogen, about or at least about 2 mg of molecular hydrogen, about or at least about 3 mg of molecular hydrogen, about or at least about 4 mg of molecular hydrogen, about or at least about 1 mg of molecular hydrogen, about or at least about 5 mg of molecular hydrogen, about or at least about 6 mg of molecular hydrogen, about or at least about 7 mg of molecular hydrogen, about or at least about 8 mg of molecular hydrogen, about or at least about 9 mg of molecular hydrogen, about or at least about 10 mg, about or at least about 15 mg, about or at least about 20 mg, about or at least about 25 mg, about or at least about 30 mg, about or at least about 35 mg, about or at least about 40 mg, about or at least about 45 mg, about or at least about 50 mg, about or at least about 55 mg, about or at least about 60 mg, about or at least about 65 mg, about or at least about 70 mg, about or at least about 75 mg or more of molecular hydrogen per 1000 mg of composition.

In embodiments, the composition for dietary consumption increases the nutritional value and/or bioavailability of an ingested nutrient. In embodiments, the composition for dietary consumption decreases nitrite accumulation and/or absorption in the gastrointestinal tract. In embodiments, the composition for dietary consumption decreases the likelihood of infection by one or more gastrointestinal pathogens. In embodiments, the composition for dietary consumption is admixed with a food and/or a beverage.

Described herein, in embodiments, is a composition for soil conditioning and/or fertilization comprising powder form of metallic magnesium at a mesh of about or at least about 20 to about or at least about 200, $CaMg(CO_3)_2$, where the powder form metallic magnesium and $CaMg(CO_3)_2$ are present in a mass ratio of 1:m, where m is greater than 5, the powder form metallic magnesium and $CaMg(CO_3)_2$ are formulated to generate molecular hydrogen in the presence of an acid and/or water, and the composition is suitable for formulation into one or more of a powder, granule, stick, or spray for applying to soil.

In embodiments, the composition for soil conditioning and/or fertilization comprises one or more metal salts, wherein the one or more metal salts comprises potassium (K), sodium (Na), calcium (Ca), magnesium (Mg), zinc (Zn), iron (Fe), boron (B), and/or aluminum (Al), one or more nitrogen sources, wherein the one or more nitrogen sources comprise ammonium nitrate (NH4NO3), ammonium sulfate ((NH4)2SO4), calcium nitrate (Ca(NO3)2), monoammonium phosphate ((NH4)H2PO4), diammonium phosphate, ((NH4)2HPO4), potassium nitrate (KNO3), urea, and/or isobutylidene diurea, one or more phosphorous sources, and/or one or more carbon sources, wherein the one or more carbon sources comprise magnesium carbonate ($MgCO_3$), calcium carbonate($CaCO_3$), carbonic acid (H2CO3), bicarbonate (HCO3−), and/or carbonate (CO3−).

In embodiments, the one or more metal salts, one or more nitrogen sources, one or more phosphorous sources, and/or one or more carbon sources is present in a range of about or at least about 1 mg to about or at least about 900 mg per 1000 mg of composition, or in a range of about or at least about 0.1% w/w to about or at least about 90% w/w.

In embodiments, the total magnesium content is in a range of about or at least about 10 mg to about or at least about 900 mg per 1000 mg of composition, or in a range of about or at least about 1% w/w to about or at least about 90% w/w.

In embodiments, the composition for soil conditioning and/or fertilization comprises about or at least about 10 mg of total magnesium, about or at least about 20 mg of total magnesium, about or at least about 30 mg of total magnesium, about or at least about 40 mg of total magnesium, about or at least about 50 mg of total magnesium, about or at least about 60 mg of total magnesium, about or at least about 70 mg of total magnesium, about or at least about 80 mg of total magnesium, about or at least about 90 mg of total magnesium, about or at least about 100 mg of total magnesium, about or at least about 150 mg of total magnesium, about or at least about 200 mg of total magnesium, about or at least about 250 mg of total magnesium, about or at least about 300 mg of total magnesium, about or at least about 350 mg of total magnesium, about or at least about 400 mg of total magnesium, about or at least about 450 mg of total magnesium, about or at least about 500 mg, about or at least about 600 mg, about or at least about 700 mg, about or at least about 800 mg, about or at least about 900 mg or more of total magnesium per 1000 mg of composition.

In embodiments, the composition for soil conditioning and/or fertilization comprises a total $CaMg(CO_3)_2$ content is in a range of about or at least about 10 mg to about or at least about 900 mg per 1000 mg of composition, or in a range of about or at least about 1% w/w to about or at least about 90% w/w.

In embodiments, the composition for soil conditioning and/or fertilization comprises about or at least about 10 mg of total $CaMg(CO_3)_2$, about or at least about 20 mg of total $CaMg(CO_3)_2$, about or at least about 30 mg of total $CaMg(CO_3)_2$, about or at least about 40 mg of total $CaMg(CO_3)_2$, about or at least about 50 mg of total $CaMg(CO_3)_2$, about or at least about 60 mg of total $CaMg(CO_3)_2$, about or at least about 70 mg of total $CaMg(CO_3)_2$, about or at least about 80 mg of total $CaMg(CO_3)_2$, about or at least about 90 mg of total $CaMg(CO_3)_2$, about or at least about 100 mg of total $CaMg(CO_3)_2$, about or at least about 150 mg of total $CaMg(CO_3)_2$, about or at least about 200 mg of total $CaMg(CO_3)_2$, about or at least about 250 mg of total $CaMg(CO_3)_2$, about or at least about 300 mg of total $CaMg(CO_3)_2$, about or at least about 350 mg of total $CaMg(CO_3)_2$, about or at least about 400 mg of total $CaMg(CO_3)_2$, about or at least about 450 mg of total $CaMg(CO_3)_2$, about or at least about 500 mg of total $CaMg(CO_3)_2$, about or at least about 600 mg of total $CaMg(CO_3)_2$, about or at least about 700 mg of total $CaMg(CO_3)_2$, about or at least about 800 mg of total $CaMg(CO_3)_2$, about or at least about 900 mg or more of total of total $CaMg(CO_3)_2$ per 1000 mg of composition.

In embodiments, the composition for soil conditioning and/or fertilization comprises powder form metallic magnesium and $CaMg(CO_3)_2$ formulated to generate about or at least about 1 mg of molecular hydrogen, about or at least about 2 mg of molecular hydrogen, about or at least about 3 mg of molecular hydrogen, about or at least about 4 mg of molecular hydrogen, about or at least about 1 mg of molecular hydrogen, about or at least about 5 mg of molecular hydrogen, about or at least about 6 mg of molecular hydrogen, about or at least about 7 mg of molecular hydrogen, about or at least about 8 mg of molecular hydrogen, about or at least about 9 mg of molecular hydrogen, about or at least about 10 mg, about or at least about 15 mg, about or at least about 20 mg, about or at least about 25 mg, about or at least about 30 mg, about or at least about 35 mg, about or at least about 40 mg, about or at least about 45 mg, about or at least about 50 mg, about or at least about 55 mg, about or at least about 60 mg, about or at least about 65 mg, about or at least about 70 mg, about or at least about 75 mg or more of molecular hydrogen per 1000 mg of composition.

In embodiments, the composition for soil conditioning and/or fertilization is formulated to generate molecular hydrogen gas in acidic or wet soil. In embodiments, the composition for soil conditioning and/or fertilization is formulated to promote plant and/or seed growth, enhance plant tolerance towards abiotic and biotic stresses, regulate plant growth and development, improve crop yield and quality, increase one or more nutritional values of plant-based products, and/or prolong shelf life of one or more plant-based products.

In embodiments, the composition for soil conditioning and/or fertilization is formulated to decrease nitrite accumulation in the soil. In embodiments, the composition for soil conditioning and/or fertilization is formulated to increase the nutrient retention of the soil and/or improve the bioavailability of soil nutrients.

Provided herein, in embodiments, are methods of supplementing a diet with molecular hydrogen comprising administering a composition comprising powder form metallic magnesium powder form metallic magnesium at a mesh of about or at least about 200 to about or at least about 350 and $CaMg(CO_3)_2$, where the powder form metallic magnesium and $CaMg(CO_3)_2$ are present in a mass ratio of 1:m, where m is greater than 5, the composition forms molecular hydrogen in the presence of gastric acid, capable of forming molecular hydrogen in the presence of gastric acid, and the composition is administered prior to, concurrent with, or after consumption of food and/or a beverage.

Provided herein, in embodiments, are methods of conditioning and/or fertilizing soil comprising applying a composition comprising powder form metallic magnesium at a mesh of about or at least about 20 to about or at least about 200 and $CaMg(CO_3)_2$, wherein the powder form metallic magnesium and $CaMg(CO_3)_2$ are present in a mass ratio of 1:m, where m is greater than 5, the composition is capable of forming molecular hydrogen in the presence of an acidic and/or wet soil, and the composition is formulated to promote plant growth and/or seed germination.

BRIEF DESCRIPTION OF THE DRAWINGS

FIG. 1 depicts a non-limiting pictorial representation of the results of an Readily Combustible Solid Analysis for a sample of metallic magnesium powder and Dolomite at a 1:7 mass ratio (DoH2). The DoH2 sample appears as a white powder packed into a line with dimensions of 10 mm×25 mm×250 mm. Dashed lines indicate approximately a 19 mm distance that was burned from applying a heat source.

DETAILED DESCRIPTION

Hydrogen-Generating Compositions

In aspects, the present disclosure provides compositions comprising powder form metallic magnesium and $CaMg(CO_3)_2$ capable of forming molecular hydrogen in the presence of an acid and/or water. $CaMg(CO_3)_2$, in embodiments, is referred to as 'dolomite,' which is a form of limestone, rich in approximately equal parts of magnesium carbonate and calcium carbonate. Dolomite, in embodiments, is used as a substitute for "generally regarded as safe" (GRAS) sources of calcium and magnesium salts.

Compositions herein, in embodiments, involve the mixing of magnesium particles with a non-combustive substance ($CaMg(CO_3)_2$) to resolve the problem of hazardous combustion involving metallic magnesium compositions, such as those described in U.S. Patent Publication No. 2015/0258136 and U.S. Patent Publication No. 2019/0166885, both of which are hereby incorporated by reference in their entirety. Compositions comprising metallic magnesium and magnesium carbonate ($MgCO_3$) or calcium carbonate ($CaCO_3$) or their combination has been considered in U.S. Pat. No. 9,144,581 to produce negative oxidation reduction potential in a food mixture. Dolomite, in embodiments, is a composition comprising $CaMg(CO_3)_2$. In embodiments, there is a functional and compositional difference between a combination of $CaCO_3$ and $MgCO_3$, which is a mixture of two independent salts, and dolomite which is a composition of $CaMg(CO_3)_2$—a distinct molecule which comprises an arrangement of two molecules, $CaCO_3$ and $MgCO_3$. The resulting reaction involving dolomite, in embodiments, emits a constant, low-level stream of hydrogen gas that is safer and more effective. In embodiments, salts of carbonates, such as dolomite, $CaMg(CO_3)_2$, when heated, emit carbon dioxide $CO_2$, which suppresses the reaction of heated magnesium metal with atmospheric oxygen. The compositions of $CaMg(CO_3)_2$, in embodiments, are suitable for dietary purposes in animal consumption.

The powder form metallic magnesium and $CaMg(CO_3)_2$, in embodiments, are present in a mass ratio of 1:m, where m is greater than 5. In non-limiting embodiments, a mixture of dolomite powder with metallic magnesium powder in a mass ratio of m to 1, where m is 5, or more than 5, passes burn and combustion tests. For instance in non-limiting examples, when heated, dolomite emits carbon dioxide that suppresses any extraneous combustion of magnesium. In embodiments, the ratio of metallic magnesium to dolomite is about or at least about 1:5, about or at least about 1:5.5, about or at least about 1:6, about or at least about 1:6.5, about or at least about 1:7, about or at least about 1:7.5, about or at least about 1:8, about or at least about 1:9, about or at least about 1:10, about or at least about 1:12, about or at least about 1:14, about or at least about 1:16, about or at least about 1:18, about or at least about 1:20, about or at least about 1:30, about or at least about 1:40, about or at least about 1:50, or the ratio is about or at least about 1:100 or greater. In embodiments, well-mixed ratios of 1:5 and higher prevent unwanted combustion or burning from magnesium, while enabling effective hydrogen gas generation.

The powder form metallic magnesium, in embodiments, is present in a mesh size range of about 200-350. Mesh, in embodiments, is a unit of measure of the fineness of powder particles/crystals, defined as the number of pores per inch in a sieve, where the larger the mesh number, the smaller the pores and finer the powder. In embodiments, the powder form metallic magnesium is about or at least about mesh 150 (e.g., approx. 100 μm), about or at least about mesh 200 (e.g., approx. 75 μm), about or at least about mesh 250 (e.g., approx. 60 μm), about or at least about mesh 300 (e.g., approx. 50 μm), 40 or at least about mesh 350 (e.g., approx. 42 μm), about or at least about mesh 400 (e.g., approx. 37 μm) or more. In embodiments, additional powder particles/crystals are approximately the same size.

The hydrogen-generating composition, in embodiments, includes one or more additional metals salts aside from $CaMg(CO_3)_2$, for example and without limitation, a powder form of a salt of one or more of potassium (K), sodium (Na), calcium (Ca), magnesium (Mg), zinc (Zn), iron (Fe), boron (B), and/or aluminum. Metal salts, in embodiments, serve as additional hydrogen generation components, as well as nutritional elements, and include post transition metals and metalloids. The metal salts herein include, in embodiments, carbonates, sulphates, phosphates, chlorides, oxides, hydrides, and/or metal salt hydrates (e.g., based on the oxidation state of the metal, such as trihydrates, hexahydrates, etc.).

The composition, in embodiments, such as in compositions intended for oral consumption, include one or more dietary ingredients. In embodiments, the one or more dietary ingredients is a water soluble vitamin, fat soluble vitamin, alkali metal, alkali earth metal, transition metal, halogen, co-factor, coenzyme, amino acid, carbohydrate, or lipid.

Water soluble vitamins, in embodiments, includes one or more of thiamine (vitamin B1), riboflavin (vitamin B2), niacin (vitamin B3), pantothenic acid (vitamin B5), pyridoxine (vitamin B6), biotin (vitamin B7), folate (vitamin B9), cobalamin (vitamin B12), and/or ascorbic acid/ascorbate (Vitamin C).

Fat soluble vitamins, in embodiments, includes one or more of carotenoids/retinoids (vitamin A), 1,25-dihydroxycholecalciferol (vitamin D), ergocalciferol (vitamin D2), cholecalciferol (vitamin D3), vitamin E, vitamin K, phylloquinone (vitamin K1), menoquinones (vitamin K2).

Alkali metals, in embodiments, includes sodium (Na), lithium (Li), and/or potassium (K). The alkali earth metal, in embodiments, includes magnesium (Mg) and/or calcium (Ca). In embodiments, the alkali metal and/or alkali earth metal is added as a salt, such as sodium chloride, potassium chloride, magnesium chloride, and/or calcium chloride.

Transition metals, in embodiments, includes one or more of iron (Fe), copper (Cu), manganese (Mn), molybdenum (Mb), chromium (Ch), cobalt (Co), selenium (Se), zinc (Zn), and/or nickel (Ni). In embodiments, individual transition metal are present in trace amounts, for example and without limitation, less than about 1% w/w to less than about 0.01% w/w.

Halogens, in embodiments, include chloride (CI) and/or fluoride (F). In embodiments, halogens are present in salts of any one of the dietary metals described herein, for example as chloride salts.

Co-factors, in embodiments, include one or more of pyrophosphate, adenosine triphosphate (ATP), adenosine diphosphate (ADP), S-adenosyl methionine (SAM), and/or nicotinamide.

Coenzymes, in embodiments, include one or more Coenzyme A, biotin, Coenzyme Q (Q10), coenzyme vitamin B2, and/or flavin adenine dinucleotide (FAD).

Amino acids, in embodiments, includes any of the 20 standard amino acids and/or any modified amino acid thereof. In embodiments, the amino acids are in their bioavailable L-form. In embodiments, the amino acid is one or more of alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, and/or valine.

Carbohydrates, in embodiments, includes polyols, sugar alcohols, monosaccharides and/or disaccharides. In embodiments, the carbohydrate comprises one or more of glucose, fructose, galactose, sucrose, lactose, and/or maltose. In embodiments, one or more carbohydrate is included in the composition to improve the taste of powder forms for mixing, for example, into foodstuffs or beverages prior to ingestion.

Lipids, in embodiments, includes one or more essential and/or nonessential dietary fats. In embodiments, the lipid comprises one or more of linoleic acid, arachidonic acid, eicosapentaenoic acid (EPA), and/or docosahexaenoic acid (DHA). Lipids include, in embodiments, omega fatty acids (e.g., omega-3/6/9 fatty acids).

Compositions herein, in embodiments, include one or more food biopolymers. Food biopolymers, in embodiments, include macromolecules that provide caloric content in the diet, including protein, carbohydrates, and fats. In embodiments, food biopolymers include one or more edible vegetable oil, animal fat, wheat gluten, starch, cellulose, gelatin, dextran, casein, collagen, alginate, pectin, tapioca, polylactic acid, polycaprolactone, and/or xanthan gum. In embodiments, vegetable oils include one or more of sunflower oil, canola oil, soybean oil, safflower oil, avocado oil, and triglycerides originating from the same.

Composition herein, in embodiments, include one or more flavoring agents, for example in powder formulations intended to be mixed with food or beverage. In embodiments, the one or more flavoring agents is included in the composition to improve the taste of powder, tablet, and/or stick forms for mixing, for example, into foodstuffs or beverages prior to ingestion.

Compositions herein, in embodiments, include one or more pharmaceutical excipients. Pharmaceutical excipients, in embodiments, include liquids (e.g., such as in the case of capsular forms), including oils, waxes, and polyols, such as those of petroleum, animal, vegetable, or synthetic origin. The pharmaceutical excipients include, in embodiments, saline, gelatin, urea, and the like. In embodiments, compositions include auxiliary agents including, stabilizing agents, thickening agents, lubricating agents, preservatives, and coloring agents. Suitable pharmaceutical excipients also include, in embodiments, starch, glucose, lactose, sucrose, malt, rice, flour, sodium stearate, glycerol monostearate, sodium chloride, dried skim milk (among other powdered milks), casein protein, whey protein, glycerol, propylene glycol, microcrystalline cellulose, maltodextrin xanthan gum, citric acid, magnesium stearate, agar-agar, and the like.

The composition, in embodiments, such as in compositions intended for oral consumption, include one or more antibiotics. Antibiotics, in embodiments, include anti-infective agents, such as without limitation, anthelmintics, anti-anaerobics, aminoglycoside antibiotics, antifungal antibiotics, cephalosporin antibiotics, macrolide antibiotics, β-lactam antibiotics, penicillin antibiotics, quinolone antibiotics, sulfonamide antibiotics, tetracycline antibiotics, antimycobacterials, antituberculosis agents, antimycobacterials, antiprotozoals, antimalarial antiprotozoals, and/or scabicides. Compositions herein, in embodiments, include one or more antiviral agents.

The composition, in embodiments, such as in compositions intended for oral consumption, include one or more therapeutics agents. Therapeutic agents, in embodiments, include FDA-approved drugs. In embodiments, the present compositions or methods contemplate the addition of one or more therapeutic agents, for example, analgesics, such as nonsteroidal anti-inflammatory drugs, opiate agonists and salicylates; anti-inflammatory agents, corticosteroid anti-inflammatory agents, antipruritics; electrolytic and renal agents, such as acidifying agents, alkalinizing agents, diuretics, carbonic anhydrase inhibitor diuretics, loop diuretics, osmotic diuretics, potassium-sparing diuretics, thiazide diuretics, electrolyte replacements, and uricosuric agents; enzymes, such as pancreatic enzymes and thrombolytic enzymes; gastrointestinal agents, such as antidiarrheals, antiemetics, gastrointestinal anti-inflammatory agents, salicylate gastrointestinal anti-inflammatory agents, antacid anti-ulcer agents, gastric acid-pump inhibitor anti-ulcer agents, gastric mucosal anti-ulcer agents, H2-blocker anti-ulcer agents, cholelitholytic agents, digestants, emetics, laxatives and stool softeners, and prokinetic agents; hormones and hormone modifiers, such as abortifacients, adrenal agents, corticosteroid adrenal agents, androgens, anti-androgens; immunobiological agents, such as immunosuppressives, toxoids, antihistamines, or cold/flu drugs; local anesthetics, such as amide local anesthetics and ester local anesthetics; musculoskeletal agents, such as anti-gout anti-inflammatory agents, corticosteroid anti-inflammatory agents, gold compound anti-inflammatory agents, immunosuppressive anti-inflammatory agents, nonsteroidal anti-inflammatory drugs (NSAIDs), or salicylate anti-inflammatory agents.

Additional non-limiting examples of useful therapeutic agents from the above categories include: (1) analgesics in general, such as lidocaine or derivatives thereof, and NSAID analgesics, including diclofenac, ibuprofen, ketoprofen, and naproxen; (2) opiate agonist analgesics, such as codeine, fentanyl, hydromorphone, and morphine; (3) salicylate analgesics, such as aspirin (ASA) (enteric coated ASA); (4) H1-blocker antihistamines, such as clemastine and terfenadine; (5) anti-infective agents, such as mupirocin; (6) anti-anaerobic anti-infectives, such as chloramphenicol and clindamycin; (7) antifungal antibiotic anti-infectives, such as amphotericin b, clotrimazole, fluconazole, and ketoconazole; (8) macrolide antibiotic anti-infectives, such as azithromycin and erythromycin; (9) miscellaneous B-lactam antibiotic anti-infectives, such as aztreonam and imipenem; (10) penicillin antibiotic anti-infectives, such a s nafcillin, oxacillin, penicillin G, and penicillin V; (11) quinolone antibiotic anti-infectives, such as ciprofloxacin and norfloxacin; (12) tetracycline antibiotic anti-infectives, such as doxycycline, minocycline, and tetracycline; (13) antituberculosis antimycobacterial anti-infectives such as isoniazid (INH), and rifampin; (14) antiprotozoal anti-infectives, such as atovaquone and dapsone; (15) antimalarial antiprotozoal anti-infectives, such as chloroquine and pyrimethamine; (16) anti-retroviral anti-infectives, such as ritonavir and zidovudine; (17) antiviral anti-infective agents, such as acyclovir, ganciclovir, interferon alfa, remdesivir, and rimantadine; (18) antifungal topical anti-infectives, such as amphotericin B, clotrimazole, miconazole, and nystatin; (19) antiviral topical anti-infectives, such as acyclovir; (20) electrolytic and renal agents, such as lactulose; (21) loop diuretics, such as furosemide; (22) potassium-sparing diuretics, such as triamterene; (23) thiazide diuretics, such as hydrochlorothiazide (HCTZ); (24) uricosuric agents, such as probenecid; (25) enzymes such as RNase, DNase, pepsin; (26) antiemetics, such as prochlorperazine; (27) salicylate gastrointestinal anti-inflammatory agents, such as sulfasalazine; (28) gastric acid-pump inhibitor anti-ulcer agents, such as omeprazole; (29) H2-blocker anti-ulcer agents, such as cimetidine, famotidine, nizatidine, and ranitidine; (30) digestants, such as pancrelipase; (31) prokinetic agents, such as erythromycin; (32) ester local anesthetics, such as benzocaine and procaine; (33) musculoskeletal corticosteroid anti-inflammatory agents, such as beclomethasone, betamethasone, cortisone, dexamethasone, hydrocortisone, and prednisone; (34) musculoskeletal anti-inflammatory immunosuppressives, such as azathioprine, cyclophosphamide, and methotrexate; (35) musculoskeletal nonsteroidal anti-inflammatory drugs (NSAIDs), such as diclofenac, ibuprofen, ketoprofen, ketorlac, and naproxen; (36) minerals, such as iron, calcium, and magnesium; (37) vitamin B compounds, such as cyanocobalamin (vitamin B12) and niacin (vitamin B3); (38) vitamin C compounds, such as ascorbic acid; and (39) vitamin D compounds, such as calcitriol.

Compositions herein, in embodiments, have the consistency of a paste, semi-solid, or wet solid from the admixture of small amounts of liquid components (e.g., oils, waxes, or aqueous components) with solid, powdered components.

Compositions herein, in embodiments, include one or more metal salts, one or more dietary ingredients, one or more food biopolymers, one or more flavoring agents, one or more pharmaceutical excipients, one or more antibiotics, and/or one or more therapeutic agents admixed in a range of about or at least about 1 mcg to about or at least about 900 mg per 1000 mg of composition. In embodiments, compositions described herein include one or more metal salts, one or more dietary ingredients, one or more food biopolymers, one or more flavoring agents, one or more pharmaceutical excipients, one or more antibiotics, and/or one or more therapeutic agents admixed in a range of about or at least about 0.0001% w/w to about or at least about 90% w/w.

Compositions herein, in embodiments, include a total magnesium content is in a range of about or at least about 10 mg to about or at least about 900 mg per 1000 mg of composition, or in a range of about or at least about 1% w/w to about or at least about 90% w/w.

Compositions herein, in embodiments, include about or at least about 10 mg of total magnesium, about or at least about 20 mg of total magnesium, about or at least about 30 mg of total magnesium, about or at least about 40 mg of total magnesium, about or at least about 50 mg of total magnesium, about or at least about 60 mg of total magnesium, about or at least about 70 mg of total magnesium, about or at least about 80 mg of total magnesium, about or at least about 90 mg of total magnesium, about or at least about 100 mg of total magnesium, about or at least about 150 mg of total magnesium, about or at least about 200 mg of total magnesium, about or at least about 250 mg of total magnesium, about or at least about 300 mg of total magnesium, about or at least about 350 mg of total magnesium, about or at least about 400 mg of total magnesium, about or at least about 450 mg of total magnesium, about or at least about 500 mg, about or at least about 600 mg, about or at least about 700 mg, about or at least about 800 mg, about or at least about 900 mg or more of total magnesium per 1000 mg of composition.

Compositions herein, in embodiments, include a total $CaMg(CO_3)_2$ content is in a range of about or at least about 10 mg to about or at least about 900 mg per 1000 mg of composition, or in a range of about or at least about 1% w/w to about or at least about 90% w/w.

Compositions herein, in embodiments, include about or at least about 10 mg of total $CaMg(CO_3)_2$, about or at least about 20 mg of total $CaMg(CO_3)_2$, about or at least about 30 mg of total $CaMg(CO_3)_2$, about or at least about 40 mg of total $CaMg(CO_3)_2$, about or at least about 50 mg of total $CaMg(CO_3)_2$, about or at least about 60 mg of total $CaMg(CO_3)_2$, about or at least about 70 mg of total $CaMg(CO_3)_2$, about or at least about 80 mg of total $CaMg(CO_3)_2$, about or at least about 90 mg of total $CaMg(CO_3)_2$, about or at least about 100 mg of total $CaMg(CO_3)_2$, about or at least about 150 mg of total $CaMg(CO_3)_2$, about or at least about 200 mg of total $CaMg(CO_3)_2$, about or at least about 250 mg of total $CaMg(CO_3)_2$, about or at least about 300 mg of total $CaMg(CO_3)_2$, about or at least about 350 mg of total $CaMg(CO_3)_2$, about or at least about 400 mg of total $CaMg(CO_3)_2$, about or at least about 450 mg of total $CaMg(CO_3)_2$, about or at least about 500 mg of total $CaMg(CO_3)_2$, about or at least about 600 mg of total $CaMg(CO_3)_2$, about or at least about 700 mg of total $CaMg(CO_3)_2$, about or at least about 800 mg of total $CaMg(CO_3)_2$, about or at least about 900 mg or more of total of total $CaMg(CO_3)_2$ per 1000 mg of composition.

Compositions herein, in embodiments, include the powder form metallic magnesium and $CaMg(CO_3)_2$ are formulated to generate about or at least about 1 mg of molecular hydrogen, about or at least about 2 mg of molecular hydrogen, about or at least about 3 mg of molecular hydrogen, about or at least about 4 mg of molecular hydrogen, about or at least about 1 mg of molecular hydrogen, about or at least about 5 mg of molecular hydrogen, about or at least about 6 mg of molecular hydrogen, about or at least about 7 mg of molecular hydrogen, about or at least about 8 mg of molecular hydrogen, about or at least about 9 mg of molecular hydrogen, about or at least about 10 mg, about or at least about 15 mg, about or at least about 20 mg, about or at least about 25 mg, about or at least about 30 mg, about or at least about 35 mg, about or at least about 40 mg, about or at least about 45 mg, about or at least about 50 mg, about or at least about 55 mg, about or at least about 60 mg, about or at least about 65 mg, about or at least about 70 mg, about or at least about 75 mg or more of molecular hydrogen per 1000 mg of composition. In embodiments, 24.3 mg of Mg creates about 2 mg of $H_2$ gas, or about 24 mL of molecular hydrogen, at room temperature.

TABLE 1

Exemplary hydrogen-generating composition for dietary supplementation.

| Component Description | Illustrative Amount |
|---|---|
| Metallic magnesium (mesh 200-350) | about 1% w/w to about or at least about 90% w/w in |
| $CaMg(CO_3)_2$ (Dolomite) | a ratio of 1:m, where m is 5 or greater |
| Metal salts (K, Na, Ca, Mg, Zn, and/or Fe) | about 0.0001% w/w to about 90% w/w |
| Dietary Supplement | about 0.0001% w/w to about 90% w/w |
| Food biopolymer | about 0.0001% w/w to about 90% w/w |
| Pharmaceutical Excipient | about 0.0001% w/w to about 90% w/w |
| Flavoring Agent | about 0.0001% w/w to about 90% w/w |
| Antibiotic and/or Therapeutic Agent | about 0.0001% w/w to about 90% w/w |

In embodiments, the composition is suitable for formulation into one or more of a tablet, capsule, pill, sachet, powder, granule, spray, and/or stick. In embodiments, the composition is suitable for oral consumption.

The composition, in embodiments, reacts to form molecular hydrogen gas in a controlled chemical reaction of the components with a special substance or composition, for example and without limitation, with acid or water. The acid, in embodiments, is hydrochloric acid. In embodiments, especially after oral consumption, the acid is gastric juice. Non-limiting examples of gastric fluid, in embodiments, include simulated gastric fluid (SGF), simulated intestinal fluid include, and/or other simulated gastric fluids and simulated intestinal fluids known to those of skill in the art, for example, simulated gastric fluid and/or intestinal fluid prepared without enzymes. In no-limiting exemplary embodiments, gastric juice includes NaCl (e.g. at 30-100 mM), HCl, and water, where the pH is adjusted from about or at least about pH 1.0 to about or at least about pH 3.0. The concentration of the gastric juice, in embodiments, is about or at least about a 10% solution relative to gastrointestinal-derived gastric juice, is about or at least about a 20% solution relative to gastrointestinal-derived gastric juice, is about or at least about a 40% solution relative to gastrointestinal-derived gastric juice, is about or at least about a 60% solution relative to gastrointestinal-derived gastric juice, is about or at least about a 80% solution relative to gastrointestinal-derived gastric juice, or is about or at least about a 100% solution or more relative to gastrointestinal-derived gastric juice, i.e., from an animal. The acid, in embodiments, is acidic soil and/or aqueous soil components. In embodiments, especially for application in soil, the acidity of the soil is about or at least about pH 3.0, about or at least about pH 4.0, about or at least about pH 5.0, about or at least about pH 6.0, about or at least about pH 7.0, about or at least about pH 8.0, about or at least about pH 9.0, about or at least about pH 10.0. In embodiments, the composition reacts with acidic soil; alternatively the soil need not be acidic, where the composition reacts with water, moisture, and/or solutes contained in the soil.

In embodiments, salts of elements such as K, Na, Ca, Mg, Zn, Fe, B, Al, among others, generate hydrogen from reaction with hydrochloric acid (the main acid of gastric juice) and also from water. In embodiments, these elements (and the salt forms thereof) function in the composition as dietary supplements.

In embodiments, the composition is intended for dietary supplementation for humans including a composition prepared from powder form metallic magnesium at a mesh of about or at least about 200 to about or at least about 350 with powder of pure dietary dolomite, $CaMg(CO_3)_2$, where the powder form metallic magnesium and $CaMg(CO_3)_2$ are admixed in a mass ratio of 1:m, where m is greater than 5, the powder form metallic magnesium and $CaMg(CO_3)_2$ are formulated to generate molecular hydrogen. In embodiments, especially for human consumption, the composition also contains other elements such as metal salts and/or food biopolymers to reduce the rate of reactions with gastric juice. In embodiments, especially for human consumption, the composition is formulated into pills, tablets, capsules, and the like, for oral consumption. In embodiments, after oral consumption, these products generate molecular hydrogen nanobubbles in gastric juice and 24.3 mg of Mg creates about 2 mg of $H_2$, or about 24 mL of molecular hydrogen at room temperature.

In embodiments, the composition is intended for dietary supplementation for pets (i.e., veterinary use) including preparing a composition, as described herein, of metallic magnesium with dietary dolomite, $CaMg(CO_3)_2$. In embodiments, especially for pet consumption, the composition also contains other elements such as metal salts, food biopolymers, and/or antibiotics or therapeutic agents to control the rate of reaction with gastric juice, and as a vehicle to enable absorption of the antibiotic or therapeutic agent. In embodiments, especially for pet consumption, the composition is added to dry pet food. In embodiments, the size (or weight) of the composition that is used differs depending on the size (or weight) of the pet.

In embodiments, the composition is intended for dietary supplementation for livestock and poultry including preparing a composition, as described herein. In embodiments, especially for livestock and poultry consumption, the composition is added to dry pet food, or added as a powder to the food prepared as a dry food for livestock and poultry. In embodiments, the size (or weight) of the composition differs depending on the size (or weight) of the livestock and poultry.

In embodiments, compositions for dietary consumption increase the nutritional value and/or bioavailability of an ingested nutrient, decrease nitrite accumulation and/or absorption in the gastrointestinal tract, and/or decrease the likelihood of infection by one or more gastrointestinal pathogens.

Methods of Dietary Supplementation

Hydrogen therapy uses molecular hydrogen for the treatment of various human diseases. Clinical research has revealed that hydrogen is an important physiological regulatory factor with antioxidant, anti-inflammatory, and anti-apoptotic protective effects on cells, for example as described in HUANG, et al., "Recent advances in hydrogen research as a therapeutic medical gas," *Free Radial Research*, Vol. 44, No. 9, 2010: pp. 971-82; OHTA, et al., "Recent progress toward hydrogen medicine: potential of molecular hydrogen for preventive and therapeutic applications," *Curr Pharm Des*. Vol. 17, No. 22, 2010: pp. 2241-52; NICOLSON, et al., "Clinical Effects of Hydrogen Administration: From Animal and Human Diseases to Exercise Medicine," *Int J Clin Med*, Vol. 7, 2016: pp. 32-76; and MATEI, et al., "Emerging mechanisms and novel applications of hydrogen gas therapy," *Med Gas Res*, Vol. 8, No. 3, 2018: pp. 98-102, each of which is hereby incorporated by reference in their entirety. Prominent effects of the $H_2$ treatment have been documented in many oxidative stress-related diseases (HUANG, 2010; OHTA, 2010; NICOLSON, 2016; MATEI, 2018).

Typically, methods of delivery of molecular hydrogen to a human or animal body include inhalation hydrogen, drinking hydrogen-enriched water (e.g., obtained either by electrolysis or dissolving hydrogen gas bubbles into water), and injection of hydrogen-saturated saline (HUANG, 2010). These methods, however, do not permit controllable hydrogen release because hydrogen equilibrium results in the hydrogen gas rapidly leaving water. Therefore, the amount of hydrogen delivered is unknown and is expected to be too small to exert any appreciable effect.

Accordingly, provided herein in embodiments, are methods of dietary supplementation of molecular hydrogen including administering a composition including powder form metallic magnesium and $CaMg(CO_3)_2$ capable of forming molecular hydrogen in the presence of gastric acid, wherein the composition is administered prior to, concurrent with, or after consumption of food or beverage. In embodiments, the composition reacts to form molecular hydrogen gas in a controlled method in which hydrogen is obtained by chemical reaction of the components with a special substance or composition, for example and without limitation with acid or water. Methods of dietary supplementation herein, in embodiments, obtain hydrogen by chemical reaction of elements such as K, Na, Ca, Mg, Zn, Fe, B, Al, among others, with hydrochloric acid (the main acid of gastric juice) and/or water to generate hydrogen gas. In embodiments, these elements are present in the form of salts (e.g., $CaMg(CO_3)_2$) in compositions for dietary supplementation.

Methods of dietary supplementation, in embodiments, include oral consumption of metallic magnesium powder and $CaMg(CO_3)_2$, among other ingredients (e.g., as detailed in Table 1) in tablet, capsule, pill, sachet, powder, stick, etc. that generates hydrogen in the medium of gastric juice or water, for example, prior to eating and/or drinking, during meal consumption, or after eating a meal. Alternatively, in embodiments, compositions are admixing with water or another suitable beverage followed subsequently by ingestion. In embodiments, compositions can be used as food additives, e.g., admixed with food for consumption.

In embodiments, each dose of the composition vehicle (e.g., capsule(s)) produces at least 20 mL of $H_2$ gas, which is sufficient to elicit the effects described herein. As referred to herein, in embodiments, the volume of $H_2$, in milliliters (mL), is a volume of $H_2$ at room temperature 20° C. (68° F.) and atmospheric pressure at sea level. In embodiments, under these conditions, for example, 10 mL of $H_2$ corresponds to a mass of 0.83 mg of molecular hydrogen. Methods herein, in embodiments, include a total daily dose of $H_2$ of at least about 6.6 mg (about 80 mL) of $H_2$. In embodiments, the composition is formulated and/or administered such that at least 6.6 mg (about 80 mL) of $H_2$ is generated in the subject's body over a period of about or at least about 4 hours, about or at least about 6 hours, about or at least about 8 hours, about or at least about 10 hours, or about or at least about 12 hours or more when the compound is administered to the subject at least one time over that period, at least two times over that period, at least three times over that period, or at least four times or more over that period. In embodiments, dosage of administration is about or at least about 0.5 mL $H_2$ per kg body weight, about or at least about 1.0 mL $H_2$ per kg body weight, about or at least about 1.5 mL $H_2$ per kg body weight, about or at least about 2.0 mL $H_2$ per kg body weight or more.

Methods of dietary supplementation, in embodiments, include ingestion of compositions described herein to react with acids in the gastrointestinal tract to generate molecular hydrogen. The release of molecular hydrogen after consumption, in embodiments, forms hydrogen nanobubbles which penetrates into the stomach walls and reaches the bloodstream, for example as described in SAFONOV and KHITRIN, "Hydrogen nanobubbles in a water solution of dietary supplement," *Colloids and Surfaces A: Physiochemistry Engineering Aspects*, Vol. 436, 2013: pp. 333-6, which is hereby incorporated by reference in its entirety.

Methods of dietary supplementation, in embodiments, include administering one or more $H_2$-generating solid forms that initiate a chemical reaction and/or release stored $H_2$ upon contact with the hydrochloric acid (and/or other liquids) in the subject's gastrointestinal tract. Without wishing to be bound by theory, in embodiments, the $H_2$ forms nanobubbles in the gastrointestinal tract, as described in SAFONOV and KHITRIN (2013), which facilitates $H_2$ penetration into tissues and organs, thereby boosting the bioavailability and/or nutritional value of ingested nutrients. In embodiments, the ingested nutrients are either consumed separately or admixed with the hydrogen-generating composition, as described herein.

Methods of dietary supplementation, in embodiments, include ingesting one or more pills, tablets, capsules, and the like, that generate at least 20 mL of $H_2$ gas in the gastric juice of the gastrointestinal tract.

In humans, nitrite accumulation can occur via the gastrointestinal tract (e.g., from consumption of certain foods such as fruit pits, almonds, and cooking of vegetables, such as cabbage, Brussels sprouts, and cauliflower), which can release nitriles through hydrolysis. Nitrite formation in the body is generally excreted via urine, although its buildup is acutely toxic, resulting in the formation of potential health conditions. Methods of dietary supplementation herein, in embodiments, decrease nitrite accumulation and/or absorption. Without wishing to be bound by theory, in embodiments, the compositions assist with neutralizing nitrites by inducing a reducing environment in close proximity to the gastrointestinal epithelia as nitrites accumulate so that they are more easily excreted from the body prior to exerting toxic effects.

Methods of dietary supplementation described herein, in embodiments, increase resiliency to pathogens, for example and without limitation, as a prophylactic supplement for one or more gastrointestinal pathogens, such as bacteria (e.g., *E. coli, Salmonella, Shigella, Campylobacter, Clostridium*), viruses (e.g., Norovirus, Rotavirus, Coronavirus, Rhinovirus, Parainfluenza), and parasites (e.g., *Giardia, Entamoeba, Ascaris*). Without wishing to be bound by theory, in embodiments, ingestion of the hydrogen-generating compositions described herein induce a reducing environment near the stomach lining and/or intestinal epithelial which decreases the likelihood of infection by gastrointestinal pathogens.

Hydrogen-Generating Compositions for Soil Conditioning and/or Fertilization

In aspects, provided herein are compositions for soil conditioning and/or fertilization including any compositions as described herein. In embodiments, compositions for soil conditioning and/or fertilization include powder form metallic magnesium at a mesh of about or at least about 20 (e.g., approx. 840 μm) to about or at least about 200 (e.g., approx. 75 μm) and $CaMg(CO_3)_2$ wherein the powder form metallic magnesium and $CaMg(CO_3)_2$ are present in a mass ratio of 1:m, where m is at least 5.

Compositions herein, in embodiments, involve the mixing of magnesium particles with a non-combustive substance ($CaMg(CO_3)_2$) to resolve the problem of hazardous combustion involving magnesium compositions, as described herein. The resulting reaction, in embodiments, emits a constant, low-level stream of hydrogen gas that is safe and effective. For instance in non-limiting examples, when heated, dolomite emits carbon dioxide that suppresses any extraneous combustion of magnesium. In embodiments, compositions described herein are enabled to serve as a soil conditions and/or fertilizer.

Compositions for soil conditioning and/or fertilization, in embodiments, include a ratio between the powder form metallic magnesium and $CaMg(CO_3)_2$ in a mass ratio of 1:m, where m is greater than 5. In embodiments, a mixture of dolomite powder with metallic magnesium powder in a mass ratio of m to 1, where m is more than 6 passes the burn and combustion test. For instance in non-limiting examples, when heated, dolomite emits carbon dioxide that suppresses any extraneous combustion of magnesium. In embodiments, the ratio of metallic magnesium to dolomite is about or at least about 1:5, about or at least about 1:5.5, about or at least about 1:6, is about or at least about 1:6.5, is about or at least about 1:7, is about or at least about 1:7.5, is about or at least about 1:8, is about or at least about 1:9, is about or at least about 1:10, is about or at least about 1:12, is about or at least about 1:14, is about or at least about 1:16, is about or at least about 1:18, is about or at least about 1:20, is about or at least about 1:30, is about or at least about 1:40, is about or at least about 1:50, or the ratio is about or at least about 1:100 or greater. In embodiments, well-mixed ratios of 1:6 and higher prevent unwanted combustion or burning from magnesium, while enabling effective hydrogen gas generation.

Compositions for soil conditioning and/or fertilization, in embodiments, include one or more additional metals salts aside from $CaMg(CO_3)_2$, as described herein.

Compositions for soil conditioning and/or fertilization, in embodiments, include one or more nitrogen sources. Nitrogen sources, in embodiments, ammonium nitrate ($NH_4NO_3$), ammonium sulfate ($(NH_4)_2SO_4$), calcium nitrate ($Ca(NO_3)_2$), monoammonium phosphate ($(NH_4)H_2PO_4$), diammonium phosphate, ($(NH_4)_2HPO_4$), potassium nitrate ($KNO_3$), urea, and/or isobutylidene diurea. The nitrogen source, in embodiments, can include organic nitrogen sources such as milled agricultural waste, lignocellulose-based waste product, processed animal feces, and the like.

Compositions for soil conditioning and/or fertilization, in embodiments, include one or more phosphorous sources and/or one or more carbon sources. In embodiments, the carbon source is magnesium carbonate ($MgCO_3$), calcium carbonate($CaCO_3$), carbonic acid ($H_2CO_3$), bicarbonate ($HCO_3^-$), and/or carbonate ($CO_3^-$).

Compositions for soil conditioning and/or fertilization, in embodiments, include one or more nitrogen source, phosphorous source, and/or carbon source admixed in a range of about or at least about 1 mg to about or at least about 900 mg per 1000 mg of composition. In embodiments, the one or more nitrogen source, phosphorous source, and/or carbon source is admixed in a range of about or at least about 0.1% w/w to about or at least about 90% w/w.

Compositions for soil conditioning and/or fertilization, in embodiments, include about or at least about 10 mg to about 900 mg of total magnesium content per 1000 mg of composition. In embodiments, soil conditioning and/or fertilization compositions described herein include a range of about or at least about 1% w/w to about or at least about 90% w/w of total magnesium content.

Compositions for soil conditioning and/or fertilization, in embodiments, include about or at least about 10 mg of total magnesium, about or at least about 20 mg of total magnesium, about or at least about 30 mg of total magnesium, about or at least about 40 mg of total magnesium, about or at least about 50 mg of total magnesium, about or at least about 60 mg of total magnesium, about or at least about 70 mg of total magnesium, about or at least about 80 mg of total magnesium, about or at least about 90 mg of total magnesium, about or at least about 100 mg of total magnesium, about or at least about 150 mg of total magnesium, about or at least about 200 mg of total magnesium, about or at least about 250 mg of total magnesium, about or at least about 300 mg of total magnesium, about or at least about 350 mg of total magnesium, about or at least about 400 mg of total magnesium, about or at least about 450 mg of total magnesium, about or at least about 500 mg, about or at least about 600 mg, about or at least about 700 mg, about or at least about 800 mg, about or at least about 900 mg or more of total magnesium per 1000 mg of composition.

Compositions for soil conditioning and/or fertilization, in embodiments, include a total $CaMg(CO_3)_2$ content is in a range of about or at least about 10 mg to about or at least about 900 mg per 1000 mg of composition, or in a range of about or at least about 1% w/w to about or at least about 90% w/w.

Compositions for soil conditioning and/or fertilization, in embodiments, include about or at least about 10 mg of total $CaMg(CO_3)_2$, about or at least about 20 mg of total $CaMg(CO_3)_2$, about or at least about 30 mg of total $CaMg(CO_3)_2$, about or at least about 40 mg of total $CaMg(CO_3)_2$, about or at least about 50 mg of total $CaMg(CO_3)_2$, about or at least about 60 mg of total $CaMg(CO_3)_2$, about or at least about 70 mg of total $CaMg(CO_3)_2$, about or at least about 80 mg of total $CaMg(CO_3)_2$, about or at least about 90 mg of total $CaMg(CO_3)_2$, about or at least about 100 mg of total $CaMg(CO_3)_2$, about or at least about 150 mg of total $CaMg(CO_3)_2$, about or at least about 200 mg of total $CaMg(CO_3)_2$, about or at least about 250 mg of total $CaMg(CO_3)_2$, about or at least about 300 mg of total $CaMg(CO_3)_2$, about or at least about 350 mg of total $CaMg(CO_3)_2$, about or at least about 400 mg of total $CaMg(CO_3)_2$, about or at least about 450 mg of total $CaMg(CO_3)_2$, about or at least about 500 mg of total $CaMg(CO_3)_2$, about or at least about 600 mg of total $CaMg(CO_3)_2$, about or at least about 700 mg of total $CaMg(CO_3)_2$, about or at least about 800 mg of total $CaMg(CO_3)_2$, about or at least about 900 mg or more of total of total $CaMg(CO_3)_2$ per 1000 mg of composition.

Compositions for soil conditioning and/or fertilization, in embodiments, include the powder form metallic magnesium and $CaMg(CO_3)_2$ formulated to generate about or at least about 1 mg of molecular hydrogen, about or at least about 2 mg of molecular hydrogen, about or at least about 3 mg of molecular hydrogen, about or at least about 4 mg of molecular hydrogen, about or at least about 5 mg of molecular hydrogen, about or at least about 6 mg of molecular hydrogen, about or at least about 7 mg of molecular hydrogen, about or at least about 8 mg of molecular hydrogen, about or at least about 9 mg of molecular hydrogen, about or at least about 10 mg, about or at least about 15 mg, about or at least about 20 mg, about or at least about 25 mg, about or at least about 30 mg, about or at least about 35 mg, about or at least about 40 mg, about or at least about 45 mg, about or at least about 50 mg, about or at least about 55 mg, about or at least about 60 mg, about or at least about 65 mg, about or at least about 70 mg, about or at least about 75 mg or more of molecular hydrogen per 1000 mg of composition. In embodiments, 24.3 mg of Mg creates about 2 mg of $H_2$ gas, or about 24 mL of molecular hydrogen, at room temperature.

TABLE 2

Exemplary hydrogen-generating composition for soil conditions and/or fertilization.

| Component Description | Illustrative Amount |
|---|---|
| Metallic magnesium (mesh 200-350) $CaMg(CO_3)_2$ (Dolomite) | about 1% w/w to about or at least about 90% w/w in a ratio of 1:m, where m is 5 or greater |
| Metal salts (K, Na, Ca, Mg, Zn, and/or Fe) | about 0.1% w/w to about or at least about 90% w/w |
| Nitrogen source | about 0.1% w/w to about or at least about 90% w/w |
| Phosphorous Source | about 0.1% w/w to about or at least about 90% w/w |
| Carbon Source | about 0.1% w/w to about or at least about 90% w/w |

Compositions for soil conditioning and/or fertilization, in embodiments, include generate molecular hydrogen in the presence of an acidic and/or wet soil. Compositions for soil conditioning and/or fertilization, in embodiments, are formulated to promote plant and/or seed growth in soil. The composition is formulated such that, in embodiments, the reaction of magnesium with water at low temperatures (e.g., 10° C.-25° C.) is relatively slow and the hydrogen released by the reaction will remain in the soil from about or at least about 1 hour to about or at least about 7 days or more, having a positive effect on plant growth.

Compositions for soil conditioning and/or fertilization, in embodiments, are formulated to decrease nitrite accumulation in the soil. Compositions for soil conditioning and/or fertilization, in embodiments, are formulated to increase the nutrient retention of the soil and/or improve the bioavailability of soil nutrient to plants.

Compositions for soil conditioning and/or fertilization, in embodiments, are formulated to be applied as a powder, granule, stick, or spray. In embodiments formulated for spraying, the composition is admixed with water prior to immediate application to and/or within the soil. Soil, in embodiments, includes all planting topsoil, including clay, sand, silt, chalk, peat, loam, and/or combinations thereof. The soil, in embodiments, is acidic.

In embodiments, the composition is intended as fertilizers for plants and trees including a mixture of dolomite fertilizer (dolomite lime) with particles of metallic magnesium at a mesh of about or at least about 20 to about or at least about 200 in the form of powder or stick helps germinate seeds and plants faster. In embodiments, especially for fertilizers for plants and trees, the reaction of the magnesium of the composition with water at low temperatures (e.g., 10° C.-25° C.) is relatively slow and therefore the hydrogen released in the reaction will remain in the soil for many hours and even days, having a positive effect on the plant's growth.

Methods of Conditioning and/or Fertilizing Soil

Hydrogen biology can enable positive outcomes in agriculture. Agriculture faces significant challenges from growing populations, climate change, natural disasters, environmental pollution, and food safety issues. Hydrogen agriculture with hydrogen-rich water is a practical application of hydrogen biology, which could address many of these challenges.

Typically, methods of delivery of molecular hydrogen to soil include hydrogen-enriched water, e.g., obtained either by electrolysis or dissolving hydrogen gas bubbles into water, or by pumping hydrogen gas into soil. These methods do not permit controllable hydrogen absorption because hydrogen equilibrium results in the hydrogen gas rapidly leaving the water, and hydrogen gas does not get captured by the soil. Therefore, the amount of hydrogen delivered is unknown and is expected to be too small to have any appreciable effect.

Accordingly, provided herein in embodiments, are methods of conditioning and/or fertilizing soil by applying a composition comprising powder form metallic magnesium at a mesh of about or at least about 20 to about or at least about 200 and $CaMg(CO_3)_2$ where the powder form metallic magnesium and $CaMg(CO_3)_2$ are present in a mass ratio of 1:m, where m is greater than 5, the composition is capable of forming molecular hydrogen in the presence of an acid and/or water, and the composition is formulated to promote plant growth in acidic soil.

When pH levels are too low (i.e., acidic), the basic nutrients that plants require remains locked up in the soil and poorly available. In embodiments, the compositions herein raise the pH level of acidic soils. In embodiments, the pH is raised by at least about 0.1, the pH is raised by at least about 0.2, the pH is raised by at least about 0.3, the pH is raised by at least about 0.4, the pH is raised by at least about 0.5, the pH is raised by at least about 0.6, the pH is raised by at least about 0.7, the pH is raised by at least about 0.8, the pH is raised by at least about 0.9, the pH is raised by at least about 1.0, the pH is raised by at least about 1.5, the pH is raised by at least about 2.0, the pH is raised by at least about 2.5 or more.

Methods of soil conditioning and/or fertilization, in embodiments, include applying one or more compositions, as described herein, formulated as a powder, granule, stick, or spray, one or more times, where a time between applications is about or at least about 1 day, about or at least about 2 days, about or at least about 3 days, about or at least about 4 days, about or at least about 5 days, about or at least about 6 days, about or at least about 7 days, about or at least about 2 weeks, about or at least about 3 weeks, about or at least about 1 month, about or at least about 2 months, about or at least about 4 months, about or at least about 6 months or more.

Methods of conditioning and/or fertilizing soil herein, in embodiments, enhance plant tolerance towards abiotic and biotic stresses and promote growth of plants and seeds. Methods herein, in embodiments, regulate plant growth and development. Methods herein, in embodiments, improve crop yield and quality. Methods herein, in embodiments, increase nutritional values of plant-based products. Methods herein, in embodiments, prolong the shelf life of plant-based products. Methods herein, in embodiments, decrease the nitrite accumulation during the storage of vegetables.

Methods of conditioning and/or fertilizing soil herein, in embodiments, exert fertilization effects on soils by influencing rhizospheric microorganisms, resulting in improved crop yield and quality, and improved postharvest quality of trees, fruits, vegetables, grass, and cut flowers, for example as described in L I, et al., "Hydrogen Commonly Applicable from Medicine to Agriculture: From Molecular Mechanisms to the Field," *Curr Pharm Des*, Vol. 27, No. 5, 2021: pp. 747-59 [ABSTRACT]; and LI et al., "The applications of molecular hydrogen in horticulture," *Horticulture*, Vol. 7, 2021: pp. 1-18, both of which are hereby incorporated by reference in their entirety.

Methods of soil conditioning and/or fertilization by hydrogen-generating compositions described herein, in embodiments, increase the soil nutritional value and bioavailability of nutrients, both of endogenous soil nutrients and nutrient applied to the soil. In embodiments, methods of soil conditioning and/or fertilization by hydrogen-generating compositions described herein decrease nitrite accumulation in the soil. In embodiments, after applying to the soil, for example in the form of a powder, granule, stick, or spray, the composition can help germinate seeds and plants faster.

Compositions and Formulations

In aspects, the composition is formulated for ingestion, for example and without limitation, intended to be ingested to address a nutritional deficiency or gastrointestinal condition. In embodiments, the compositions of the present invention are formulated to provide an effective known amount of molecular hydrogen gas as the active ingredient. Typically, the compositions also comprise one or more pharmaceutically acceptable excipients, carriers, including inert solid diluents and fillers and permeation enhancers (e.g., for improving hydrogen nanobubble absorption).

Pharmaceutical excipients can be liquids, such as water, oils, and polyols, including those of petroleum, animal, vegetable, or synthetic origin. The pharmaceutical excipients can be, for example, saline, bacteriostatic water, gelatin, urea, and the like. In addition, auxiliary, stabilizing, thickening, lubricating, and coloring agents can be used. Pharmaceutically acceptable excipients are generally sterile when administered to a subject. Suitable pharmaceutical excipients also include starch, glucose, lactose, sucrose, gelatin, malt, rice, flour, chalk, silica gel, sodium stearate, glycerol monostearate, talc, sodium chloride, dried skim milk, glycerol, propylene, glycol, water, ethanol, and the like. Any composition disclosed herein, if desired, can also formulated with emulsifying agents.

In aspects, the composition is formulated to include one or more antibiotics, as described herein. In aspects, the composition is formulated to include one or more therapeutics agents, as described herein.

In embodiments, the composition comprises an excipient or carrier. In embodiments, the diluent is a pharmaceutically acceptable excipient or carrier.

In embodiments, the active ingredient is typically mixed with an excipient and/or enclosed within a carrier in the form of, for example, a capsule, tablet, sachet, paper, or other container. When the excipient serves as a diluent, it can be a solid, powder, semisolid, or liquid material (e.g., normal saline), which acts as a vehicle, carrier or medium for the active ingredient. In embodiments, the compositions can be admixed into the form of elixirs, suspensions, emulsions, solutions, syrups, gels, soft and hard gelatin capsules, suppositories, and sterile injectable solutions, for example, immediately prior to use.

Kits

The disclosure, in embodiments, provides kits that can simplify the use, administration, and/or methods of any compositions described herein. An exemplary kit of the invention comprises any agent/composition described herein in unit dosage form. In embodiments, the unit dosage form is a container, such as a bottle or blister pack of pills, tablets, capsules, and/or sticks, which can be sterile, containing any composition described herein and a pharmaceutically acceptable carrier, diluent, excipient, or vehicle. In embodiments, the unit dosage form is a container, such as a bucket, pack, or spray bottle of powder, granules, and/or sticks containing any composition described herein, In embodiments, the kit further comprises a label or printed instructions instructing the use of any composition described herein. In embodiments, the kit also includes an application tool, shaker bottle, or the like, for consuming the composition or applying the composition to soil.

In embodiments, the kit comprises two or more components to be admixed for use. In embodiments, kits herein include powder form metallic magnesium and powder form dolomite to be mixed and instructions for use. In non-limiting exemplary embodiments, the kit includes two or more packs of powdered compositions, one being powder form metallic magnesium and dolomite, and the other being powder form of one or more food biopolymers, pharmaceutical excipients, nitrogen sources, carbon sources, and the like, to be mixed for immediate use.

In embodiments, the kit comprises a composition having a shelf stability ranging from about 6 months to about 3 years or more. In embodiments, the kit comprises a composition having a shelf stability of about or at least about 6 months, about or at least about 8 months, about or at least about 10 months, about or at least about 1 year, about or at least about 2 years, about or at least about 3 years or longer when stored at a temperature ranging from about −85° C. to about 25° C.

In embodiments, the storage temperature is about −20° C. (e.g., freezer storage). In embodiments, the storage temperature is about 4° C. (e.g., refrigeration). In embodiments, the storage temperature is about 20° C. (e.g., room temp storage). In embodiments, the kit includes a powdered formulation.

Subjects and/or Animals

In embodiments, the subject and/or animal is a mammal, e.g., a human, livestock such as a horse, cow, pig, sheep, chicken, or turkey, a pet such as a dog, cat, bird, among other types of pets. In embodiments, the human is a pediatric human, human adult, geriatric human, an infant or child.

In embodiments, the method herein includes administering compositions described herein to a human who has an age in a range of from about 0 months to about 6 months old, from about 6 months to about 12 months old, from about 12 months to about 18 months old, from about 18 months to about 36 months old, from about 1 year to about 5 years old, from about 5 years to about 10 years old, from about 10 years to about 15 years old, from about 15 years to about 20 years old, from about 20 years to about 25 years old, from about 25 years to about 30 years old, from about 30 years to about 35 years old, from about 35 years to about 40 years old, from about 40 years to about 45 years old, from about 45 years to about 50 years old, from about 50 years to about 55 years old, from about 55 years to about 60 years old, from about 60 years to about 65 years old, from about 65 years to about 70 years old, from about 70 years to about 75 years old, from about 75 years to about 80 years old, from about 80 years to about 85 years old, from about 85 years to about 90 years old, from about 90 years to about 95 years old or from about 95 years to about 100 years old or older.

In embodiments, the subject is a non-human animal, and therefore the invention pertains to veterinary use. In embodiments, the non-human animal is a household pet, a livestock animal, or a laboratory animal. In embodiments, the compositions herein can be added to dry and/or wet pet food or livestock/poultry feed. In embodiments, the size (or weight) of the composition may differ depending on the size (or weight) of the animal to take the composition.

EXAMPLES

Example 1

Combustion and Safety Analysis of Dolomite Compositions

A Readily Combustible Solid Analysis and Water Reactivity Analysis was performed in accordance with the Code of Federal Regulations, Title 49, and the United Nations Transport of Dangerous Goods Manual of Tests and Criteria, Seventh revised edition (2019). The purpose of this experimentation was to demonstrate that the composition is safe for use and produces an appreciable amount of hydrogen gas.

Readily Combustible Solid Analysis

This test was performed to identify the ability of the substance to propagate combustion for metal powders or powders of metal alloys and non-metallic pastes, powders, and granular substances. The test was divided into two parts 1) a Preliminary Screening to rule out substances that do not meet the criteria immediately, and 2) a Burn Rate Test. If the substance did not ignite and did not propagate combustion by either burning with flame or smoldering along 200 mm length of the powder train (i.e., a continuous line of powder) within the 20 minute test period, then the substance was not classified as a flammable solid and the Burn Rate Test was not performed.

A sample of metallic magnesium powder and dolomite at a 1:7 mass ratio (DoH2) was poured into a rectangular mold and then inverted onto a cool impervious base plate to form an unbroken line of packed white powder at a height of 10 mm by a width of 20 mm by a length of 250 mm (e.g., as illustrated in FIG. 1). A gas burner was placed at one end of the sample and ignition was attempted for a maximum of 5 minutes for metal powders to determine the burn rate along a 200 mm distance of the sample train. As shown in FIG. 1, after a flame was applied for 5 minutes, the sample propagated approximately 19 mm with smoldering and sparks. At the end of the 20 minute test period no further propagation was observed. According to these data, the DoH2 sample was not classified as a flammable solid and the Burn Rate Test was not performed.

Water Reactivity Analysis

This test was performed to identify materials that, when in contact with water, are liable to become spontaneously flammable or to give off gas at a rate of >1 L/kg of material/hr. Based on the reactivity, the sample was classified into one of three groupings based on rate of gas evolution measured: 1) Packing Group I (at least 10 L/kg/min); 20 Packing Group II (at least 20 L/kg/hr), and 3) Packing Group III (at least 1 L/kg/hr).

Twenty five (25) g. of the DoH2 sample was placed in 3 separate Erlenmeyer flasks that were then attached to vacuum apparatuses and combined with distilled water via a funnel to measure a volume of between 100 mL to 250 mL of gas evolution. Gas evolution was monitored every minute for one hour and then hourly for a minimum of 6 additional hours. Table 3 below summarizes the gas evolution in 3 independent trials. Trails were performed at 66.1° F. (approx. 18.9° C.) and 28.5% humidity.

TABLE 3

| Water Reactivity Analysis results | | | | | | | | | | | | |
|---|---|---|---|---|---|---|---|---|---|---|---|---|
| Trial: | 1 | | | | 2 | | | | 3 | | | |
| Temperature: | 66.1° F. | | | | 66.1° F. | | | | 66.1° F. | | | |
| Humidity: | 28.5% | | | | 28.5% | | | | 28.5% | | | |
| Beginning Water/Oil Volume | 250 mL | | | | 250 mL | | | | 250 mL | | | |
| Beginning Sample | 25.00 g | | | | 25.00 g | | | | 25.00 g | | | |
| Water Volume Added to sample | 25 mL | | | | 25 mL | | | | 25 mL | | | |
| | Time | mis | Time | mix | Time | mis | lime | mis | Time | mis | Time | mis |
| | 00:01:00 | 22 | 0039:00 | 176 | 00:01:00 | 220 | 00:39:00 | 1'76 | 00:01:00 | 220 | 00:39:00 | 176 |
| | 00:02:00 | 216 | 00:40:00 | 176 | 00:02:00 | 214 | 00:40:00 | 176 | 00:02:00 | 214 | 00:40:00 | 176 |
| | 00:03:00 | 212 | 00:41:00 | 176 | 00:03:00 | 210 | 00:41:00 | 176 | 00:03:00 | 212 | 0041:00 | 176 |
| | 00:04:00 | 21 | 00:42:00 | 176 | 00:04:00 | 210 | 00:42:00 | 176 | 00:04:00 | 210 | 00:42:00 | 176 |
| | 00:05:00 | 20 | 00:43:00 | 176 | 00:05:00 | 208 | 00:43:00 | 174 | 00:05:00 | 208 | 00:43:00 | 176 |
| | 00:06:00 | 208 | 00:44:00 | 174 | 00:06:00 | 206 | 00:44:00 | 174 | 00:06:00 | 206 | 00:44:00 | 174 |
| | 00:07:00 | 20 | 00:45:00 | 174 | 00:07:00 | 204 | 00:45:00 | 174 | 00:07:00 | 204 | 00:45:00 | 174 |
| | 00:08:00 | 20 | 00:46:00 | 174 | 00:08:00 | 202 | 00:46:00 | 174 | 00:08:00 | 202 | 00:46:00 | 174 |
| | 00:09:00 | 20 | 00:47:00 | 174 | 00:09:00 | 200 | 00:47:00 | 174 | 00:09:00 | 200 | 00:47:00 | 174 |
| | 00:10:00 | 20 | 00:48:00 | 174 | 00:10:00 | 198 | 00:48:00 | 174 | 00:10:00 | 198 | 00:48:00 | 174 |
| | 00:11:00 | 19 | 00:49:00 | 174 | 00:11:00 | 196 | 00:49:00 | 172 | 00:11:00 | 196 | 00:49:00 | 174 |
| | 00:12:00 | 19 | 00:50:00 | 172 | 0012:00 | 194 | 00:50:00 | 172 | 00:12:00 | 194 | 00:50:00 | 174 |
| | 00:13:00 | 194 | 00:51:00 | 172 | 00:13:00 | 192 | 00:51:00 | 172 | 00:13:00 | 192 | 00:51:00 | 172 |
| | 00:14:00 | 19 | 00:52:00 | 172 | 0014:00 | 190 | 00:52:00 | 172 | 0014:00 | 192 | 00:52:00 | 172 |
| | 00:15:00 | 19 | 00:53:00 | 172 | 00:15:00 | 188 | 00:53:00 | 172 | 00:15:00 | 190 | 00:53:00 | 172 |
| | 00:16:00 | 19 | 00:54:00 | 172 | 0016:00 | 188 | 00:54:00 | 172 | 0016:00 | 188 | 00:54:00 | 172 |
| | 00:17:00 | 18 | 00:55:00 | 172 | 00:17:00 | 188 | 00:55:00 | 172 | 00:17:00 | 188 | 00:55:00 | 172 |
| | 00:18:00 | 18 | 00:56:00 | 172 | 00:18:00 | 186 | 00:56:00 | 172 | 00:18:00 | 186 | 00:56:00 | 172 |
| | 00:19:00 | 18 | 00:57:00 | 172 | 00:19:00 | 186 | 00:57:00 | 170 | 00:19:00 | 186 | 00:57:00 | 172 |
| | 00:20:00 | 186 | 00:58:00 | 172 | 00:20:00 | 186 | 00:58:00 | 170 | 00:20:00 | 186 | 00:58:00 | 170 |
| | 00:21:00 | 18 | 00:59:00 | 170 | 00:21:00 | 186 | 00:59:00 | 170 | 00:21:00 | 184 | 00:59:00 | 170 |
| | 00:22:00 | 18 | 01:00:00 | 170 | 0022:00 | 184 | 01:0000 | 170 | 0022:00 | 184 | 01:00:00 | 170 |
| | 0023:00 | 18 | 02:00:00 | 160 | 00:23:00 | 184 | 02:00:00 | 160 | 00:23:00 | 184 | 02:00:00 | 160 |
| | 00:24:00 | 18 | 03:00:00 | 152 | 00:24:00 | 182 | 03:00:00 | 152 | 00:24:00 | 184 | 03:00:00 | 152 |
| | 00:25:00 | 184 | 04:00:00 | 148 | 00:25:00 | 182 | 04:00:00 | 146 | 0025:00 | 182 | 04:00:00 | 146 |
| | 00:26:00 | 182 | 05:00:00 | 142 | 00:26:00 | 182 | 05:00:00 | 138 | 00:26:00 | 182 | 05:00:00 | 140 |
| | 00:27:00 | 18 | 06:00:00 | 136 | 00:27:00 | 182 | 06:00:00 | 132 | 00:27:00 | 182 | 06:00:00 | 134 |
| | 00:28:00 | 18 | 07:00:00 | 130 | 00:28:00 | 180 | 07:00:00 | 128 | 00:28:00 | 182 | 07:00:00 | 130 |
| | 00:29:00 | 18 | 08:00:00 | 128 | 00:29:00 | 180 | 08:00:00 | 124 | 00:29:00 | 180 | 08:00:00 | 126 |
| | 00:30:00 | 18 | 09:00:00 | 122 | 00:30:00 | 180 | 09:00:00 | 118 | 00:30:00 | 180 | 09:00:00 | 120 |
| | 00:31:00 | 18 | 24:00:00 | 108 | 00:31:00 | 180 | 24:00:00 | 72 | 00:31:00 | 180 | 24:00:00 | 86 |
| | 00:32:00 | 18 | | | | | | | 00:32:00 | 180 | | |
| | 00:33:00 | 18 | | | | | | | | | | |
| | 00:34:00 | 17 | | | | | | | | | | |
| | 00:35:00 | 17 | | | | | | | | | | |
| | 00:36:00 | 17 | | | | | | | | | | |
| | 00:37:00 | 17 | | | | | | | | | | |
| | 00:38:00 | 17 | | | | | | | | | | |
| Maximum Gas Evolution Rate Rate | 220 L/kg/hr. | | | | 220 L/kg/hr. | | | | 2.20 L/kg/hr | | | |
| Hour | 1 | | | | 1 | | | | 1 | | | |

TABLE 4

| Maximum Gas Evolution Rate Calculation | | | |
|---|---|---|---|
| hr | mL Gas Evolved | mL/g/hr | L/kg/hr |
| Trail 1 | | | |
| 1 | 250 mL oil at start − 25 mL water added to sample = 225 mL oil at beginning of the hour<br>225 mL − 170 mL oil at the end of the hour = 55 mL of gas evolved from sample | 55 mL gas evolved<br>25.00 g sample | 2.20 L/kg/hr |
| Trial 2 | | | |
| 1 | 250 mL oil at start − 25 mL water added to sample = 225 mL oil at beginning of the hour | 55 mL gas evolved | 2.20 L/kg/hr |

TABLE 4-continued

| Maximum Gas Evolution Rate Calculation | | | |
|---|---|---|---|
| hr | mL Gas Evolved | mL/g/hr | L/kg/hr |
| | 225 mL − 170 mL oil at the end of the hour = 55 mL of gas evolved from sample | 25.00 g sample | |
| | Trial 3 | | |
| 1 | 250 mL oil at start − 25 mL water added to sample = 225 mL oil at beginning of the hour | 55 mL gas evolved | 2.20 L/kg/hr |
| | 225 mL − 170 mL oil at the end of the hour = 55 mL of gas evolved from sample | 25.00 g sample | |

Table 4 above summarizes the calculations performed for deriving the gas evolution rates of the 3 trials. Testing on all samples was concluded after 9 hours because the rate of gas evolution was steady or declining.

In conclusion, the material was observed to not be a Readily Combustible Solid because the sample did not propagate combustion across 200 mm in less than 20 minutes. According to the water reactivity data, the sample was classified as Packing Group III due to the observed gas evolution of 2.2 L/kg/hr in all three trials. The data demonstrated a slow reactivity with water that is not anticipated to produce damage to gastrointestinal tissue, especially at the dosage ranges described herein. Various mass ratios of metallic magnesium powder and dolomite were tested, such as 1:5 mass ratios, which were also observed to exhibit the same Readily Combustible Solid and water reactivity results. These data demonstrate that the combination generated an appreciable amount of gaseous hydrogen at reactivity rates that are considered safe for consumption.

Definitions

The following definitions are used in connection with the invention disclosed herein. Unless defined otherwise, all technical and scientific terms used herein have the same meaning as commonly understood to one of skill in the art to which this invention belongs.

An "effective amount," as used with respect to hydrogen generating compositions, in embodiments, is an amount that is effective for generating an amount of gaseous hydrogen, as those described herein, or an amount that is intended to achieve an effect as described herein.

As used herein, "a," "an," or "the" can mean one or more than one.

As used herein, the word "include," and its variants, is intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present technology that do not contain those elements or features.

Although the open-ended term "comprising," as a synonym of terms such as including, containing, or having, is used herein to describe and claim the invention, the present invention, or embodiments thereof, and may alternatively be described using alternative terms such as "consisting of" or "consisting essentially of."

The term "salt," as used in reference to metal salts, in embodiments, includes the basic elemental metal particles and ionic salts, oxides, and/or hydroxides thereof, including without limitation, carbonates, sulphates, phosphates, chlorides, oxides, hydrides, and/or metal salt hydrates (e.g., based on the oxidation state of the metal, such as trihydrates, hexahydrates, etc.).

The terms "soil conditioning," and "soil fertilization," and its equivalencies as used herein, in embodiments, refer to improving or otherwise modulating the soil structure and its ability to retain water and nutrients, as well as increasing the soil content of soil nutrients, including nitrogen content, phosphorous content, and/or carbon content.

EQUIVALENTS

Those skilled in the art will recognize, or be able to ascertain, using no more than routine experimentation, numerous equivalents to the specific embodiments described specifically herein. Such equivalents are intended to be encompassed in the scope of the following claims.

As used herein, all headings are simply for organization and are not intended to limit the disclosure in any manner. The content of any individual section may be equally applicable to all sections.

What is claimed is:

1. A composition comprising:

(a) powder form of metallic magnesium; and (b) $CaMg(CO_3)_2$, wherein the composition forms molecular hydrogen in the presence of an acid solution and/or water, and wherein the powder form metallic magnesium and $CaMg(CO_3)_2$ are present in a mass ratio of 1: m, where m is from 5 to about 20.

2. The composition of claim 1, and/or wherein the powder form metallic magnesium is about mesh 200 to about mesh 350.

3. The composition of claim 1, further comprising one or more metal salts, wherein the one or more metal salts is a salt of potassium (K), sodium (Na), calcium (Ca), magnesium (Mg), zinc (Zn), iron (Fe), boron (B), and/or aluminum (Al).

4. The composition of claim 1, further comprising one or more dietary ingredients, wherein the one or more dietary ingredients comprises:

a water soluble vitamin, fat soluble vitamin, alkali metal, alkali earth metal, transition metal, halogen, co-factor, coenzyme, amino acid, carbohydrate, or lipid;

wherein the water soluble vitamin comprises one or more of thiamine (vitamin B1), riboflavin (vitamin B2), niacin (vitamin B3), pantothenic acid (vitamin B5), pyridoxine (vitamin B6), biotin (vitamin B7), folate (vitamin B9), cobalamin (vitamin B12), and/or ascorbic acid/ascorbate (Vitamin C);

wherein the fat soluble vitamin comprises one or more of carotenoids/retinoids (vitamin A), 1,25-dihydroxycholecalciferol (vitamin D), ergocalciferol (vitamin D2), cholecalciferol (vitamin D3), vitamin E, vitamin K, phylloquinone (vitamin K1), menoquinones (vitamin K2);

wherein the alkali metal comprises sodium (Na), lithium (Li), and/or potassium (K);

wherein the alkali earth metal comprises magnesium (Mg) and/or calcium (Ca);

wherein the transition metal comprises one or more of iron (Fe), copper (Cu), manganese (Mn), molybdenum (Mb), chromium (Ch), cobalt (Co), selenium (Se), zinc (Zn), and/or nickel (Ni);

wherein the halogen is fluoride (F), chloride (CI), bromine (Br), and/or iodine (I);

wherein the co-factor comprises one or more of pyrophosphate, adenosine triphosphate (ATP), adenosine diphosphate (ADP), S-adenosyl methionine (SAM), and/or nicotinamide;

wherein the coenzyme comprises one or more Coenzyme A, biotin, Coenzyme Q (Q10), coenzyme vitamin B2, and/or flavin adenine dinucleotide (FAD);

wherein the amino acid comprises one or more of alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, and/or valine;

wherein the carbohydrate comprises one or more of glucose, fructose, galactose, sucrose, lactose, and/or maltose; and/or wherein the lipid comprises one or more of linoleic acid, arachidonic acid, eicosapentaenoic acid (EPA), and/or docosahexaenoic acid (DHA).

5. The composition of claim 1, further comprising:

one or more food biopolymers;

one or more flavoring agents;

one or more pharmaceutical excipients;

one or more antibiotics; and/or one or more therapeutic agents.

6. The composition of claim 5, wherein the one or more food biopolymers comprises one or more edible vegetable oil, animal fat, wheat gluten, starch, cellulose, gelatin, dextran, casein, collagen, alginate, pectin, tapioca, polylactic acid, polycaprolactone, and/or xanthan gum.

7. The composition of claim 1, wherein the composition comprises one or more metal salts, one or more dietary ingredients, one or more food biopolymers, one or more flavoring agents, one or more pharmaceutical excipients, one or more antibiotics, and/or one or more therapeutic agents present in a range of about 1 mcg to about 900 mg per 1000 mg of composition, or in a range of about 0.0001% w/w to about 90% w/w.

8. The composition of claim 1, further comprising:

one or more one or more nitrogen sources, wherein the one or more nitrogen sources comprise ammonium nitrate ($NH_4NO_3$), ammonium sulfate ($(NH_4)_2SO_4$), calcium nitrate ($Ca(NO_3)_2$), monoammonium phosphate ($(NH_4)$ $H_2PO_4$), diammonium phosphate, ($(NH_4)_2HPO_4$), potassium nitrate ($KNO_3$), urea, and/or isobutylidene diurea;

one or more phosphorous sources; and/or one or more carbon sources, wherein the one or more carbon sources comprise magnesium carbonate ($MgCO_3$), calcium carbonate ($CaCO_3$), carbonic acid ($H_2CO_3$), bicarbonate ($HCO_3^-$), and/or carbonate ($CO_3^-$).

9. The composition of claim 8, wherein the one or more nitrogen sources, one or more phosphorous sources, and/or one or more carbon sources is present in a range of about 1 mg to about 900 mg per 1000 mg of composition, or in a range of about 0.1% w/w to about 90% w/w.

10. The composition of claim 1, wherein the total magnesium content is in a range of about 10 mg to about 900 mg per 1000 mg of composition, or in a range of about 1% w/w to about 90% w/w.

11. The composition of claim 1, wherein the total $CaMg(CO_3)_2$ content is in a range of about 10 mg to about 900 mg per 1000 mg of composition, or in a range of about 1% w/w to about 90% w/w.

12. The composition of claim 1, wherein the powder form metallic magnesium and $CaMg(CO_3)_2$ are formulated to generate about 1 mg of molecular hydrogen, about 2 mg of molecular hydrogen, about 3 mg of molecular hydrogen, about 4 mg of molecular hydrogen, about 5 mg of molecular hydrogen, about 6 mg of molecular hydrogen, about 7 mg of molecular hydrogen, about 8 mg of molecular hydrogen, about 9 mg of molecular hydrogen, about 10 mg, about 15 mg, about er at least about 20 mg, about 25 mg, about 30 mg, about 35 mg, about 40 mg, about 45 mg, about 50 mg, about 55 mg, about 60 mg, about 65 mg, about 70 mg, or about 75 mg or more of molecular hydrogen per 1000 mg of composition.

13. The composition of claim 1, wherein the composition is suitable for formulation into one or more of a tablet, capsule, pill, sachet, powder, granule, spray, and/or stick.

14. The composition of claim 1, wherein the composition is suitable for oral consumption, and wherein the acid solution is hydrochloric acid and/or gastric juice.

15. A composition for dietary consumption comprising:

(a) powder form metallic magnesium at a mesh of about 200 to about 350; and (b) $CaMg(CO_3)_2$;

wherein the powder form metallic magnesium and $CaMg(CO_3)_2$ are present in a mass ratio of 1: m, where m is greater than 5 up to about 20;

wherein the powder form metallic magnesium and $CaMg(CO_3)_2$ are formulated to generate molecular hydrogen in the presence of an acid and/or water; and wherein the composition is suitable for formulation into one or more of a tablet, capsule, pill, sachet, powder, and/or stick for oral consumption.

16. The composition of claim 15, wherein the composition is admixed with a food and/or a beverage, and/or wherein the composition further comprises:

one or more metal salts, wherein the one or more metal salts comprises potassium (K), sodium (Na), calcium (Ca), magnesium (Mg), zinc (Zn), iron (Fe), boron (B), and/or aluminum (Al);

one or more dietary ingredients, wherein the one or more dietary ingredients is a water soluble vitamin, fat soluble vitamin, alkali metal, alkali earth metal, transition metal, halogen, co-factor, coenzyme, amino acid, carbohydrate, or lipid;

one or more food biopolymers, wherein the one or more food biopolymers is an edible vegetable oil, animal fat, wheat gluten, starch, cellulose, gelatin, dextran, casein, collagen, alginate, pectin, tapioca, polylactic acid, polycaprolactone, and/or xanthan gum;

one or more flavoring agents;

one or more pharmaceutical excipients; and/or one or more antibiotics and/or therapeutics agents, and wherein the one or more metal salts, one or more dietary ingredients, one or more food biopolymers, one or more flavoring agents, one or more pharmaceutical excipients, and/or one or more antibiotics and/or therapeutics agents is present in a range of about 1 mcg to about 900 mg per 1000 mg of composition, or in a range of about 0.0001% w/w to about er at least about 90% w/w;

wherein the total magnesium content is in a range of about 10 mg to 900 mg per 1000 mg of composition, or in a range of about 1% w/w to 90% w/w; and/or wherein the total $CaMg(CO_3)_2$ content is in a range of about 10 mg to about 900 mg per 1000 mg of composition, or in a range of about 1% w/w to about 90% w/w.

17. The composition of claim 15, wherein the composition:

increases the nutritional value and/or bioavailability of an ingested nutrient;

decreases nitrite accumulation and/or absorption in the gastrointestinal tract; and/or decreases the likelihood of infection by one or more gastrointestinal pathogens.

18. A composition for soil conditioning and/or fertilization comprising:

(a) powder form metallic magnesium at a mesh of about 20 to about 200; and (b) $CaMg(CO_3)_2$;

wherein the powder form metallic magnesium and $CaMg(CO_3)_2$ are present in a mass ratio of 1: m, where m is greater than 5 up to about 20;

wherein the powder form metallic magnesium and $CaMg(CO_3)_2$ are formulated to generate molecular hydrogen in the presence of an acid and/or water; and wherein the composition is suitable for formulation into one or more of a powder, granule, stick, or spray for applying to soil.

19. The composition of claim 18, further comprising:

one or more metal salts, wherein the one or more metal salts comprises potassium (K), sodium (Na), calcium (Ca), magnesium (Mg), zinc (Zn), iron (Fe), boron (B), and/or aluminum (Al);

one or more nitrogen sources, wherein the one or more nitrogen sources comprise ammonium nitrate ($NH_4NO_3$), ammonium sulfate ($(NH_4)_2SO_4$), calcium nitrate ($Ca(NO_3)_2$), monoammonium phosphate ($(NH_4)H_2PO_4$), diammonium phosphate, ($(NH_4)_2HPO_4$), potassium nitrate ($KNO_3$), urea, and/or isobutylidene diurea;

one or more phosphorous sources; and/or one or more carbon sources, wherein the one or more carbon sources comprise magnesium carbonate ($MgCO_3$), calcium carbonate ($CaCO_3$), carbonic acid ($H_2CO_3$), bicarbonate ($HCO_3^-$), and/or carbonate ($CO_3^-$); and wherein the one or more metal salts, one or more nitrogen sources, one or more phosphorous sources, and/or one or more carbon sources is present in a range of about 1 mg to about 900 mg per 1000 mg of composition, or in a range of about 0.1% w/w to about 90% w/w;

wherein the total magnesium content is in a range of about 10 mg to about 900 mg per 1000 mg of composition, or in a range of about 1% w/w to about 90% w/w; and/or wherein the total $CaMg(CO_3)_2$ content is in a range of about 10 mg to about 900 mg per 1000 mg of composition, or in a range of about 1% w/w to about 90% w/w.

20. The composition of claim 18, wherein:

the composition is formulated to generate molecular hydrogen gas in acidic or wet soil;

the composition is formulated to promote plant and/or seed growth, enhance plant tolerance towards abiotic and biotic stresses, regulate plant growth and development, improve crop yield and quality, increase one or more nutritional values of plant-based products, and/or prolong shelf life of one or more plant-based products;

the composition is formulated to decrease nitrite accumulation in the soil; and/or the composition is formulated to increase the nutrient retention of the soil and/or improve the bioavailability of soil nutrients.

* * * * *